(12) United States Patent
Maekawa et al.

(10) Patent No.: US 12,273,001 B2
(45) Date of Patent: Apr. 8, 2025

(54) COIL, STATOR COMPRISING SAME, AND MOTOR

(71) Applicant: Panasonic Intellectual Property Management Co., Ltd., Osaka (JP)

(72) Inventors: Takeru Maekawa, Osaka (JP); Kazuaki Nishimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 287 days.

(21) Appl. No.: 17/998,944

(22) PCT Filed: Apr. 27, 2021

(86) PCT No.: PCT/JP2021/016750
§ 371 (c)(1),
(2) Date: Nov. 16, 2022

(87) PCT Pub. No.: WO2021/241113
PCT Pub. Date: Dec. 2, 2021

(65) Prior Publication Data
US 2023/0231434 A1    Jul. 20, 2023

(30) Foreign Application Priority Data

May 29, 2020    (JP) .................................. 2020-094713

(51) Int. Cl.
*H02K 3/32* (2006.01)
*H02K 1/14* (2006.01)
*H02K 3/18* (2006.01)

(52) U.S. Cl.
CPC ............... *H02K 3/325* (2013.01); *H02K 1/14* (2013.01); *H02K 3/18* (2013.01)

(58) Field of Classification Search
CPC ........... H02K 3/325; H02K 1/14; H02K 3/18; H02K 3/24; H02K 21/16
(Continued)

(56) References Cited

U.S. PATENT DOCUMENTS

| 2001/0010442 A1* | 8/2001 | Yasuhara ................. H02K 3/12 |
| | | 310/201 |
| 2020/0195075 A1 | 6/2020 | Hishida et al. |
| 2021/0021167 A1 | 1/2021 | Maeda et al. |

FOREIGN PATENT DOCUMENTS

| DE | 102012212637 | 1/2014 |
| EP | 3783629 A1 | 2/2021 |

(Continued)

OTHER PUBLICATIONS

International Search Report of PCT application No. PCT/JP2021/016750 dated Jul. 27, 2021.
(Continued)

*Primary Examiner* — Jose A Gonzalez Quinones
(74) *Attorney, Agent, or Firm* — Rimon P.C.

(57) ABSTRACT

A coil includes: a strand-wound body configured with stacked n turns of a wound strand that is made of a conductor and has a quadrangular cross-section, where n is a natural number; and an insulating resin covering a surface of the strand-wound body. An i-th turn, where i is an integer and $1 \leq i \leq n$, has a quadrangular ring shape having four side portions, and in the i-th turn, the insulating resin covers a surface of each of the four side portions. In the first to n-th turns, the insulating resin is continuously and integrally formed.

17 Claims, 19 Drawing Sheets

(58) Field of Classification Search
USPC .......................................... 310/65, 201, 208
See application file for complete search history.

(56) References Cited

FOREIGN PATENT DOCUMENTS

| | | | | |
|---|---|---|---|---|
| JP | 05111206 A | * | 4/1993 | |
| JP | 2006-042500 | | 2/2006 | |
| JP | 2011-045178 | | 3/2011 | |
| JP | 2017-163666 | | 9/2017 | |
| JP | 2017163666 A | * | 9/2017 | |
| WO | 2010/131319 | | 11/2010 | |
| WO | WO-2010131319 A1 | * | 11/2010 | ............. H02K 15/12 |
| WO | 2018/190124 | | 10/2018 | |
| WO | 2019/203076 A1 | | 10/2019 | |

OTHER PUBLICATIONS

The EPC Office Action dated Nov. 6, 2023 for the related European Patent Application No. 21812219.0.

* cited by examiner

FIG. 2
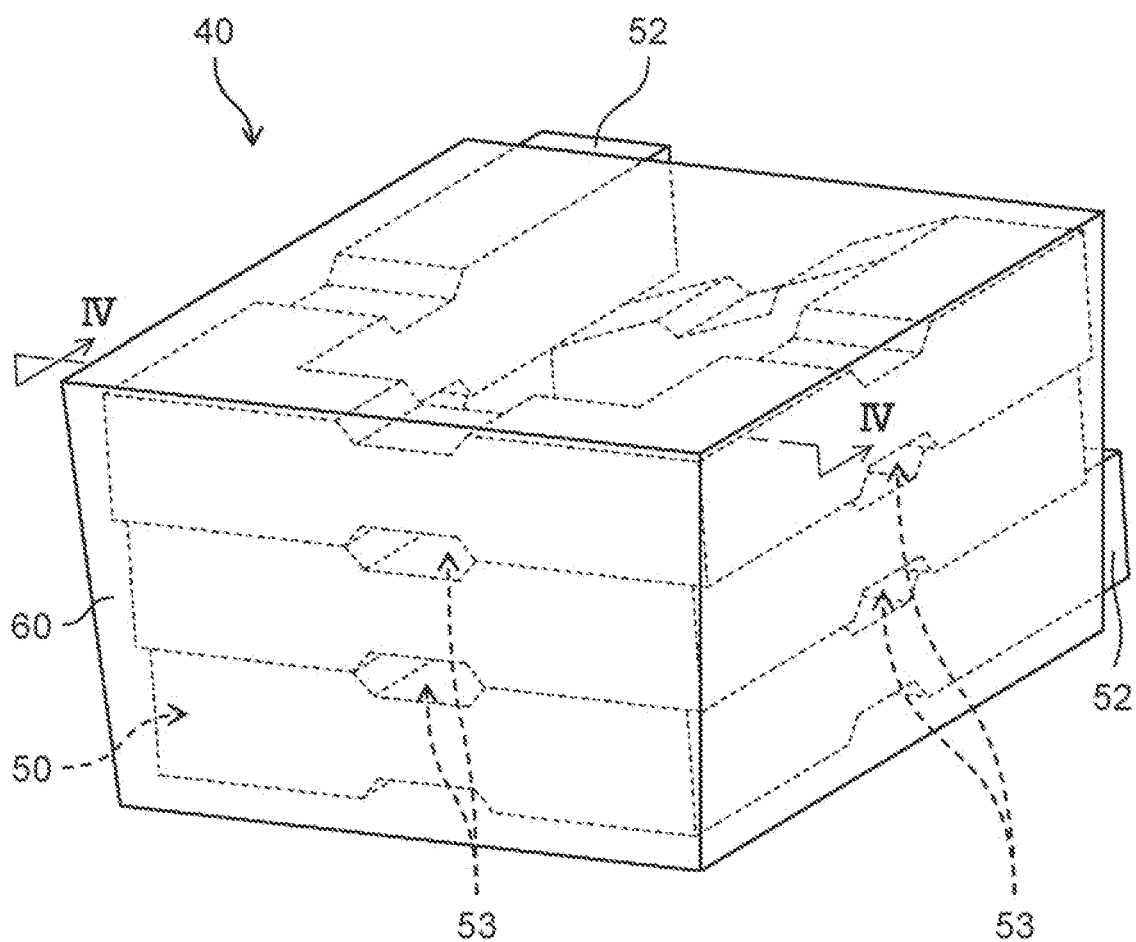
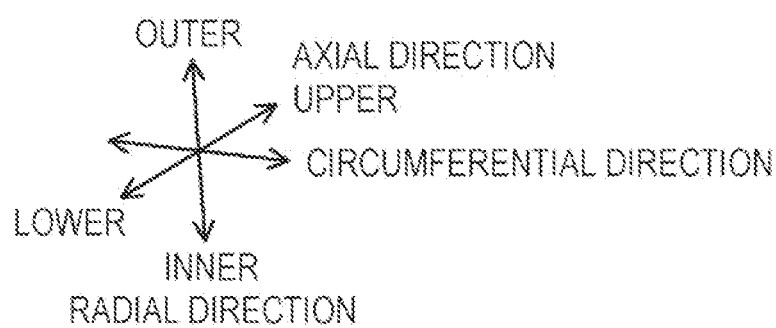

FIG. 3
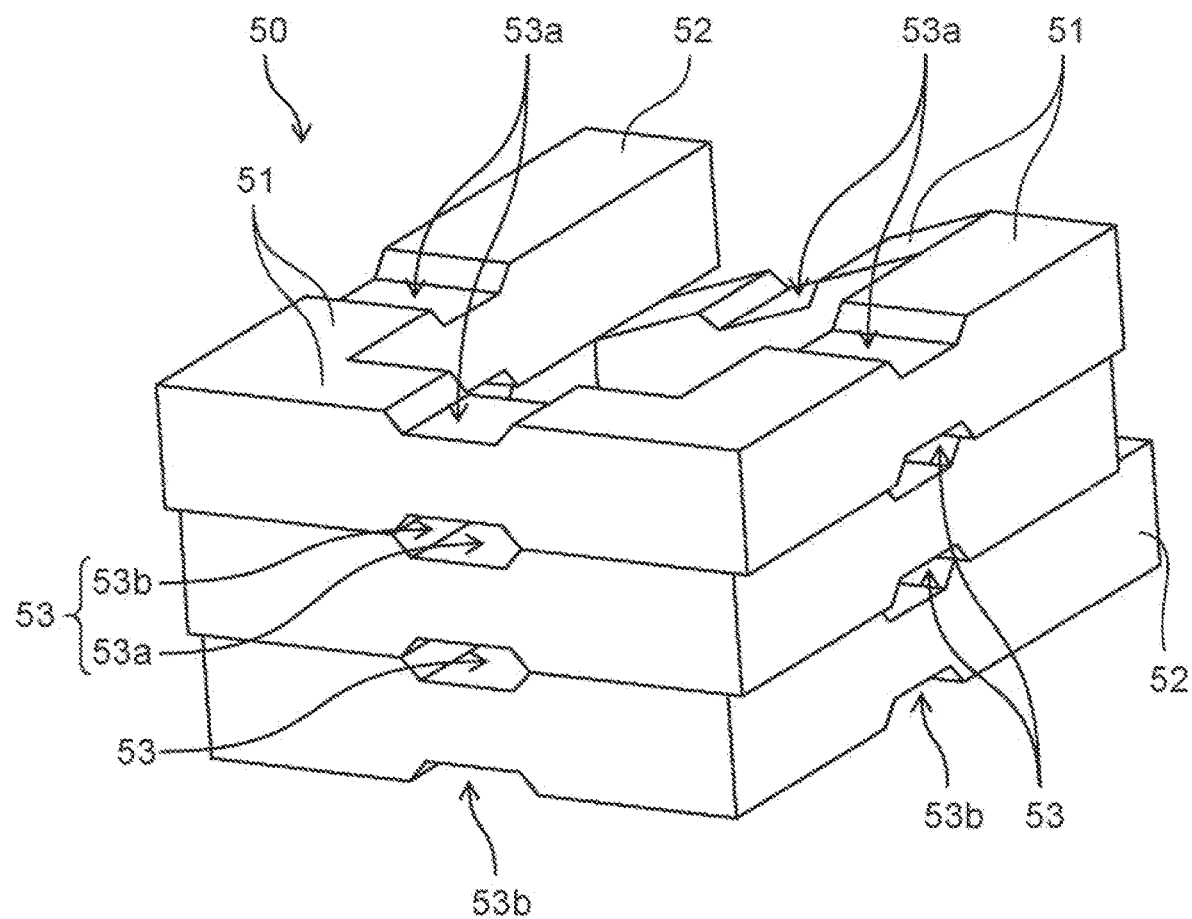
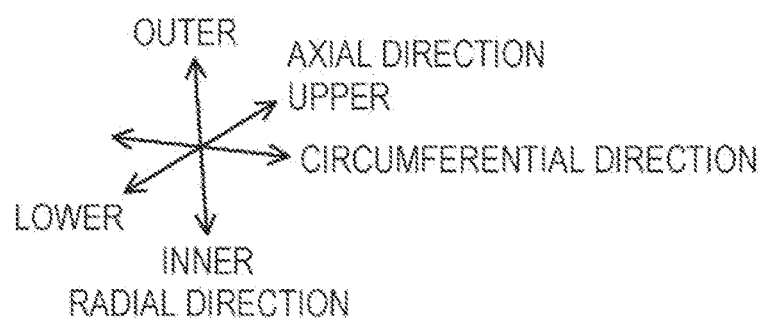

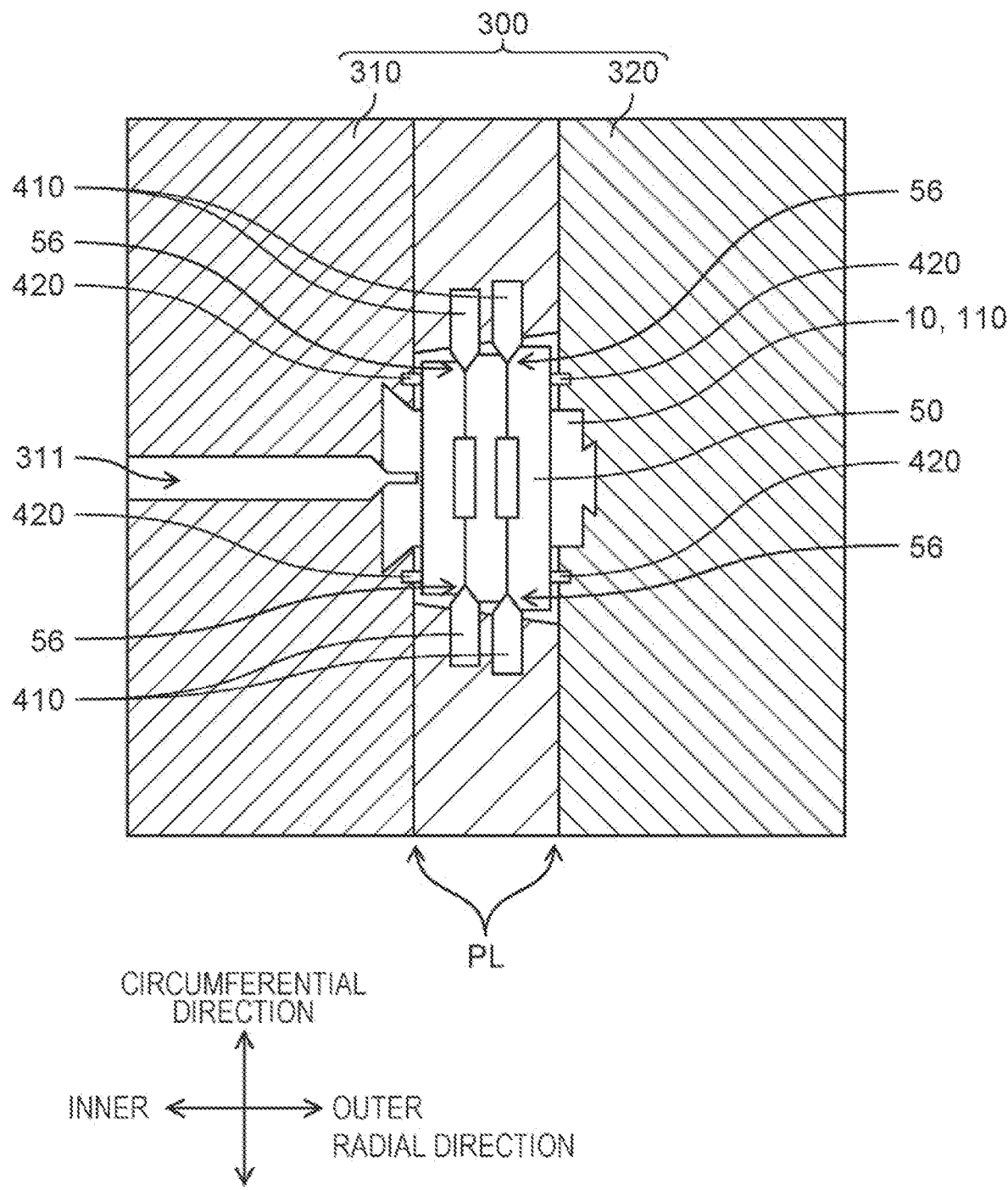

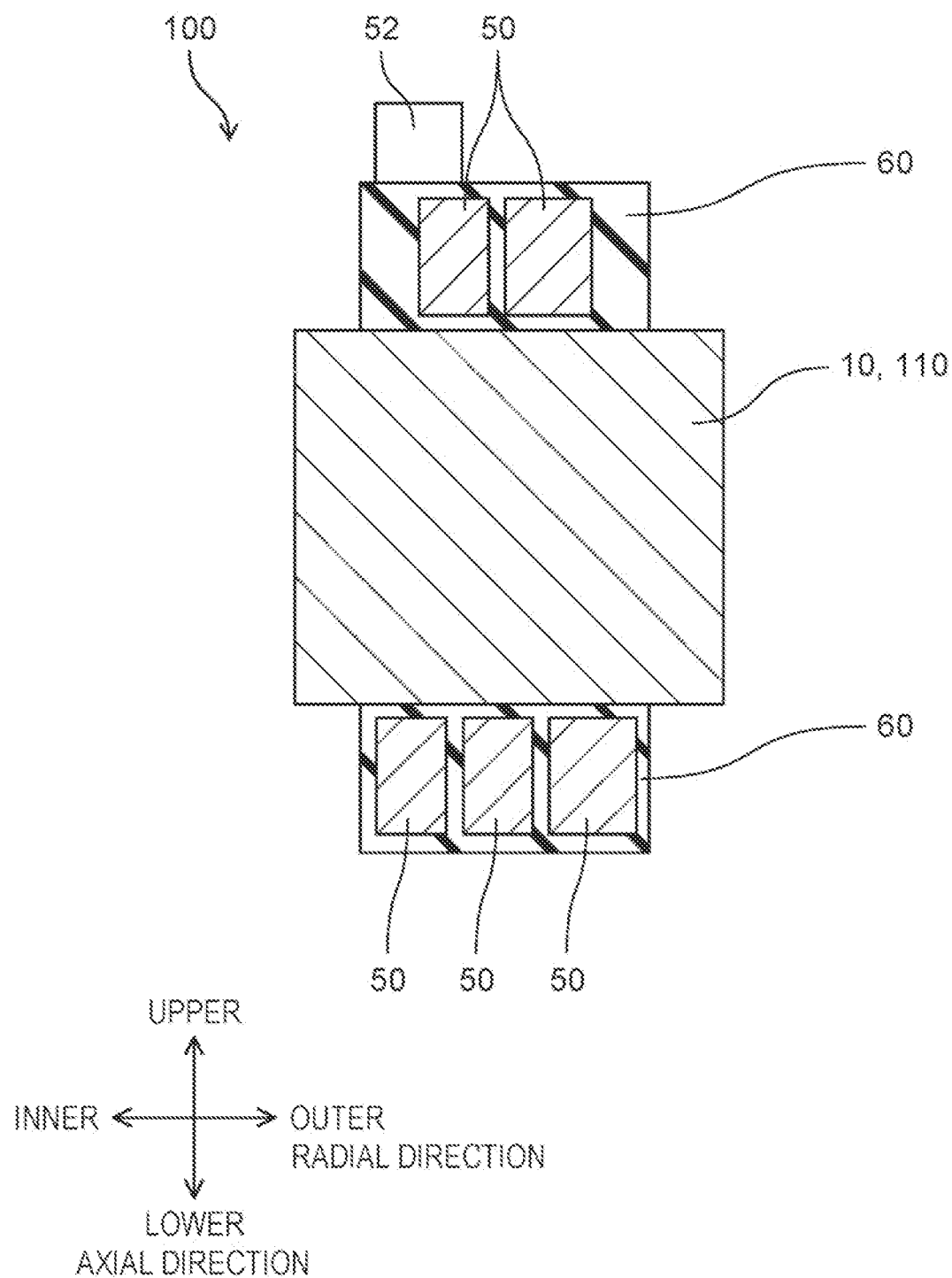

FIG. 8
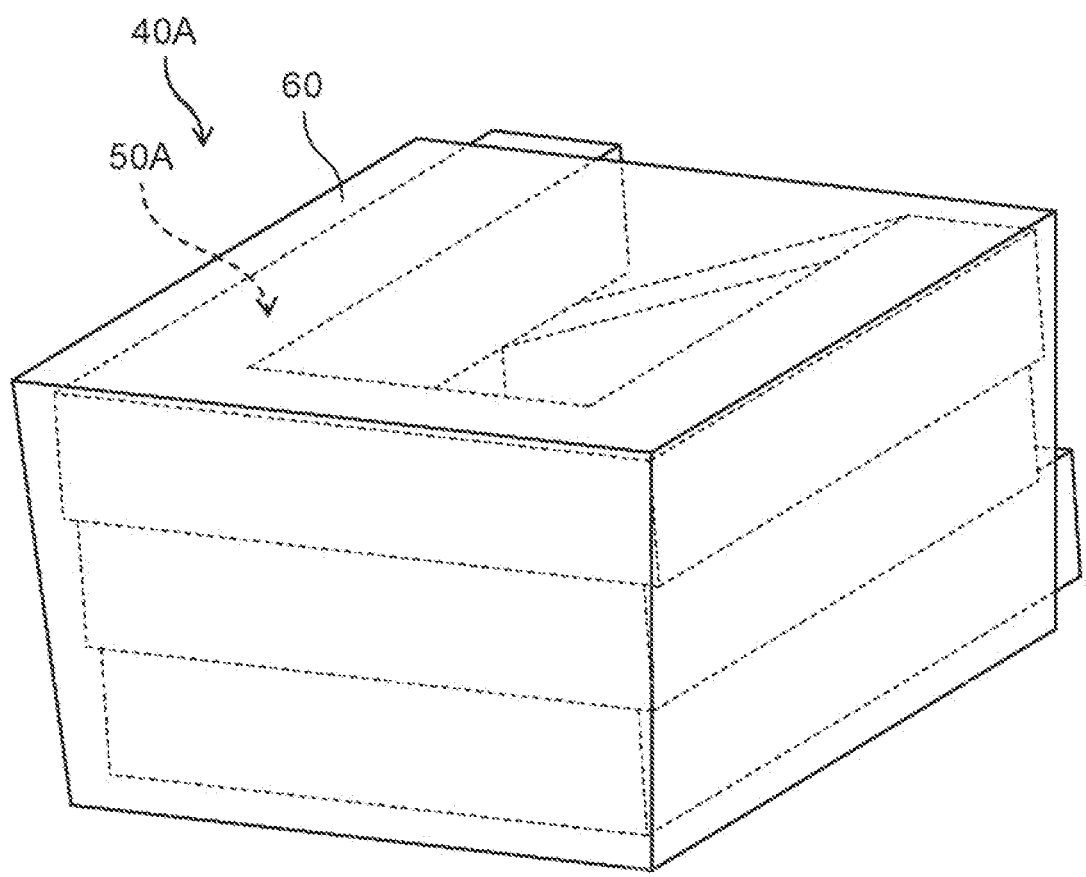
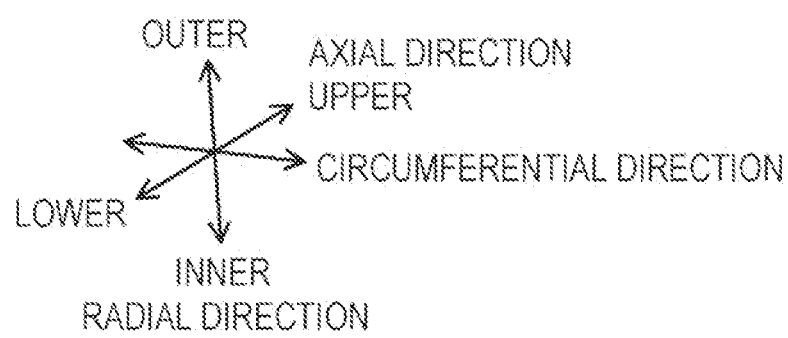

FIG. 9
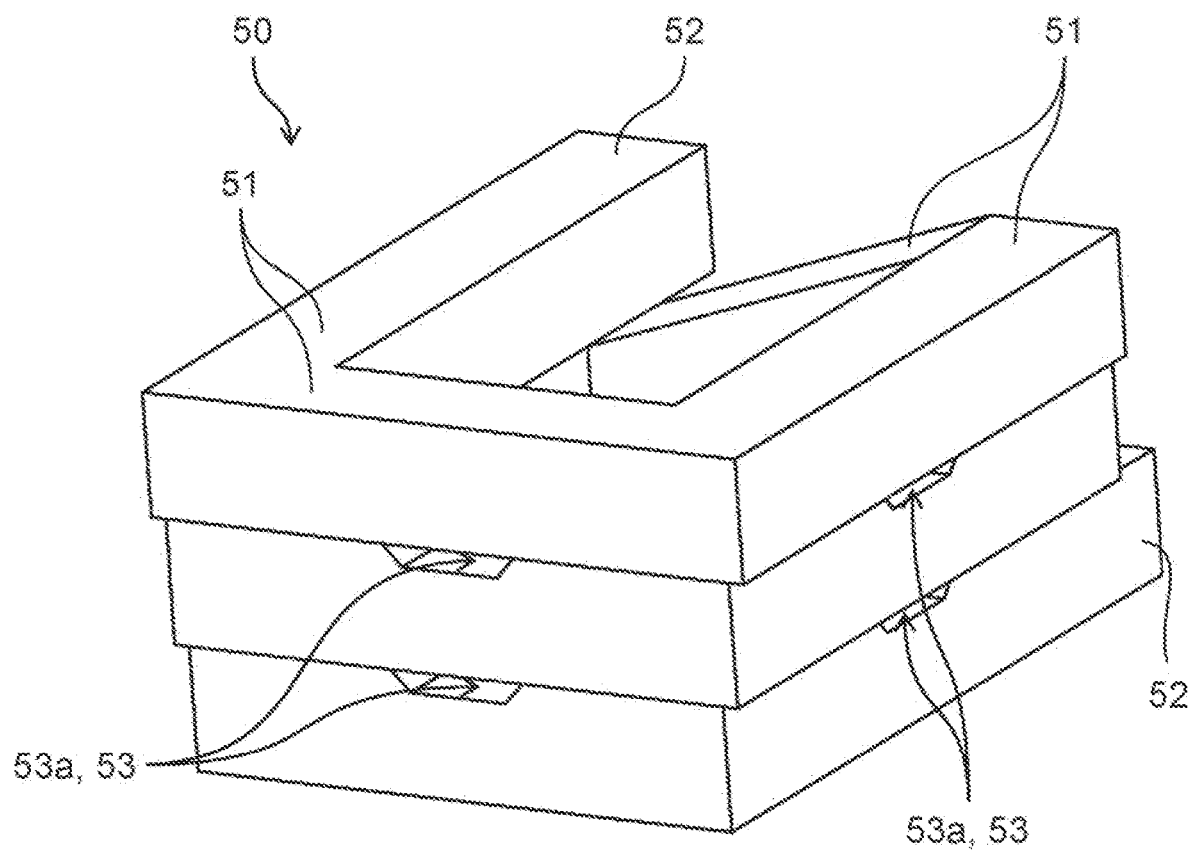
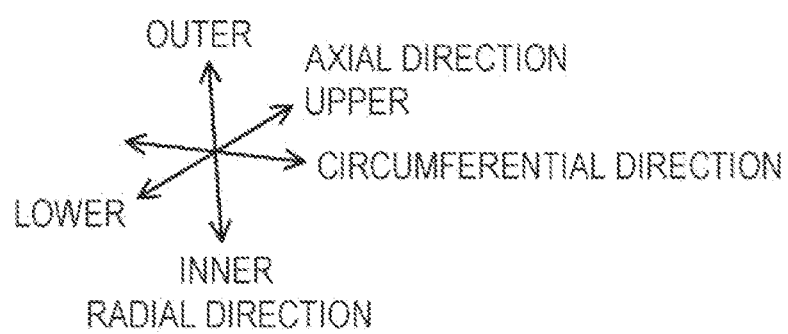

FIG. 10
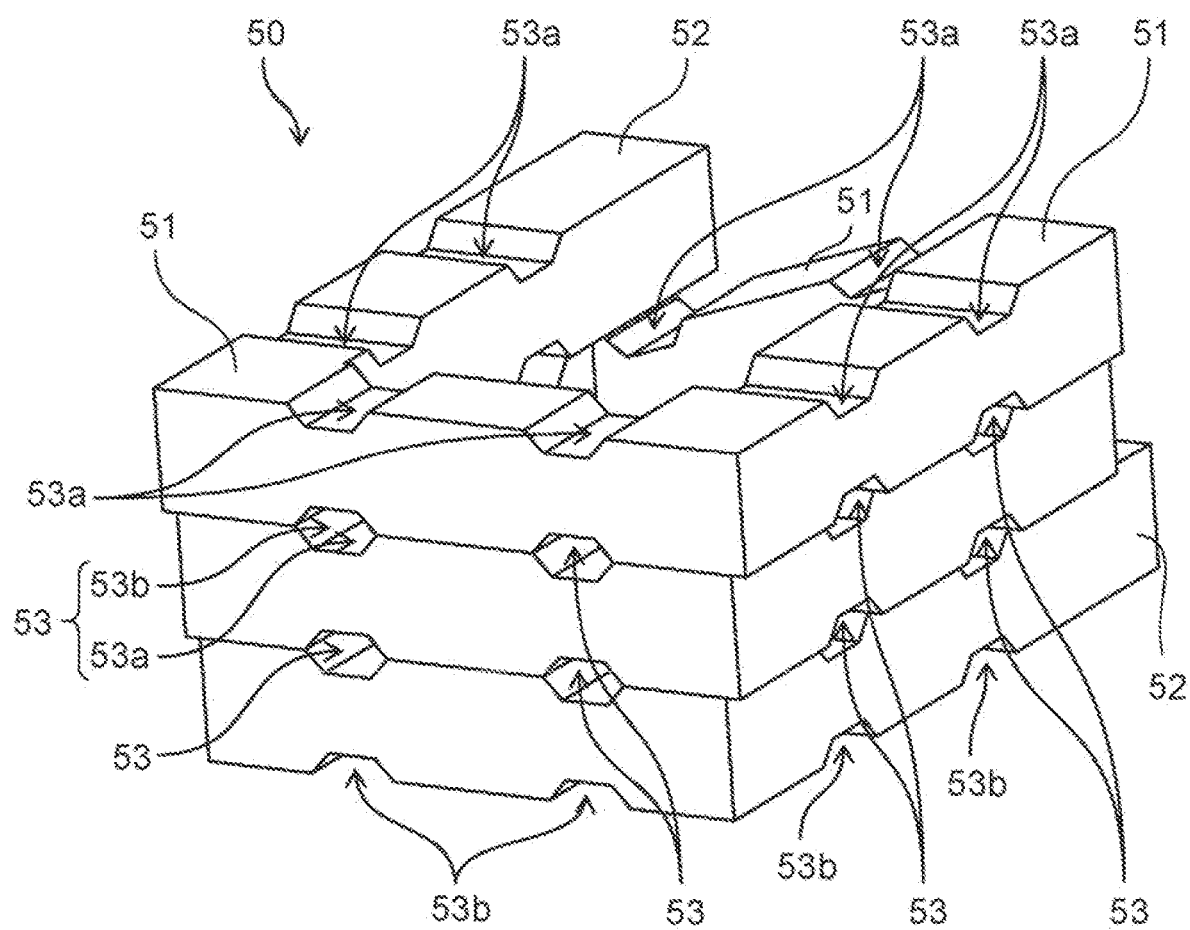
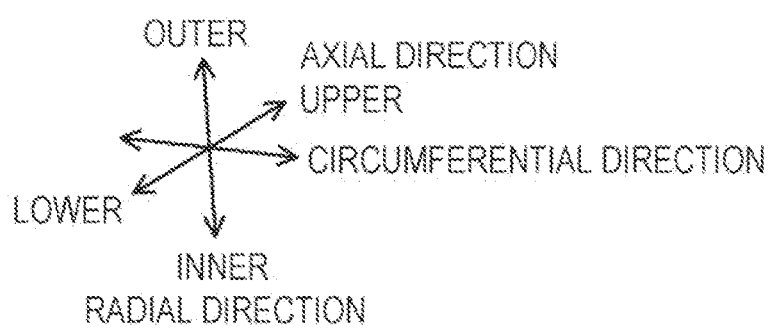

FIG. 11
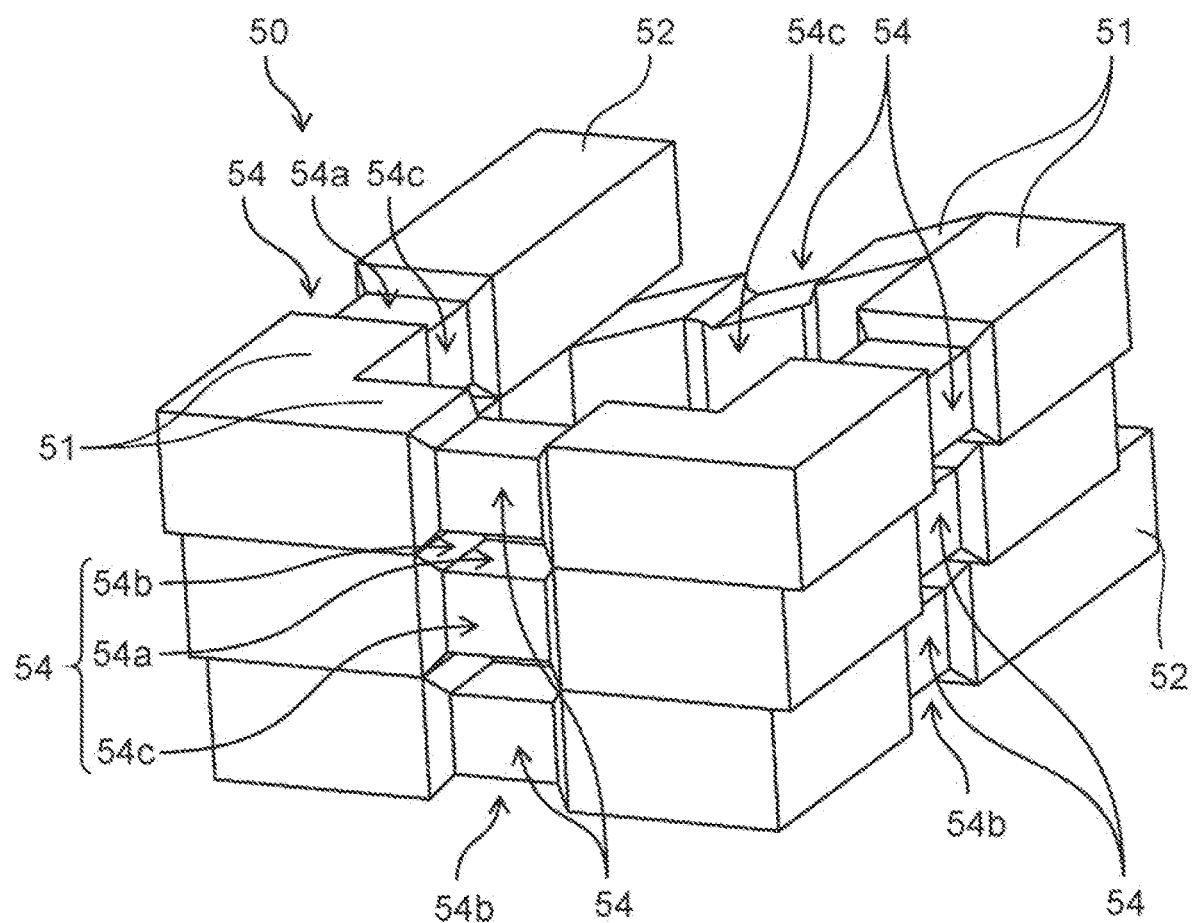
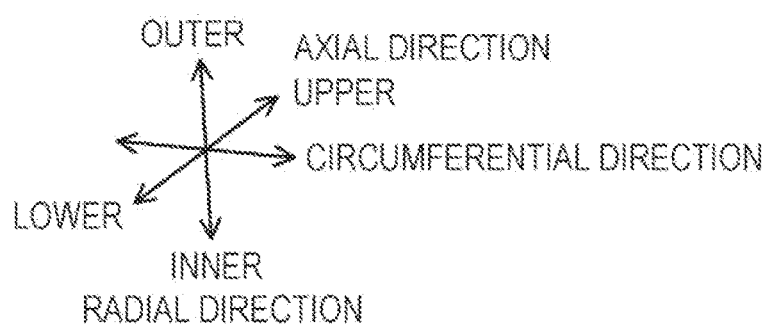

FIG. 12
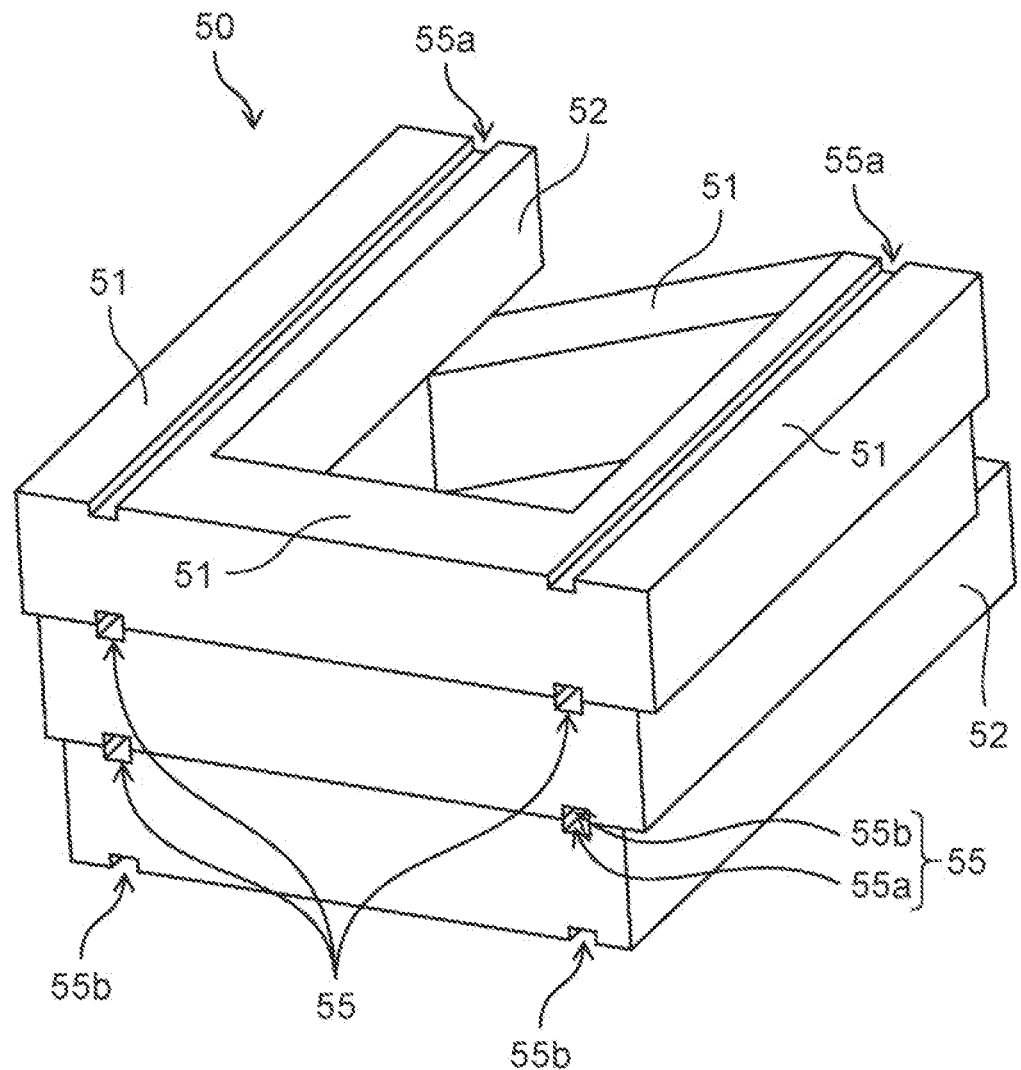
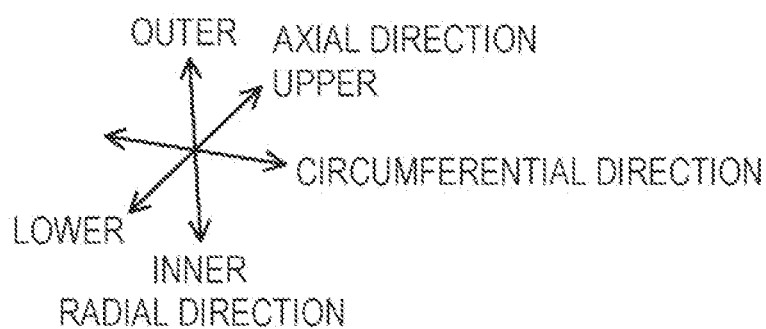

FLOW DIRECTION OF RESIN

FLOW DIRECTION OF RESIN

FIG. 15
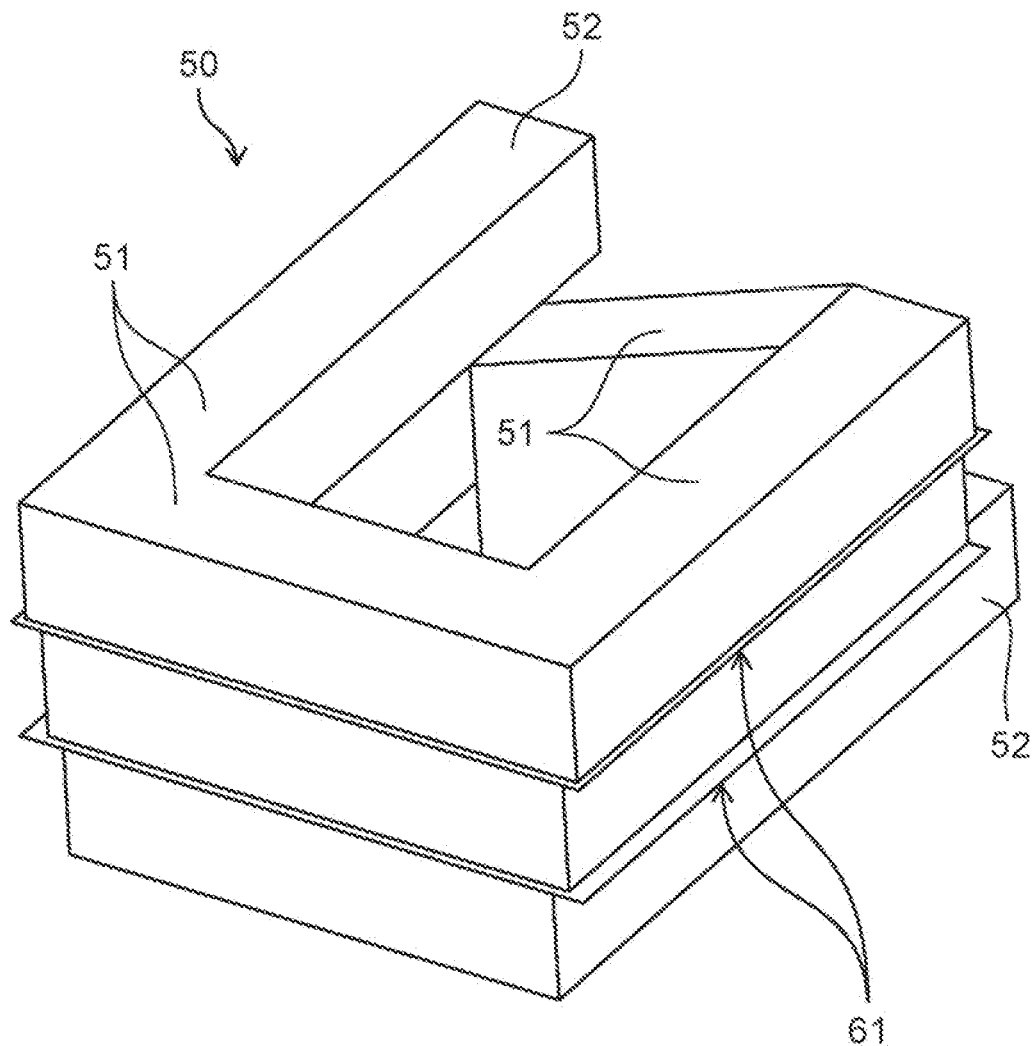
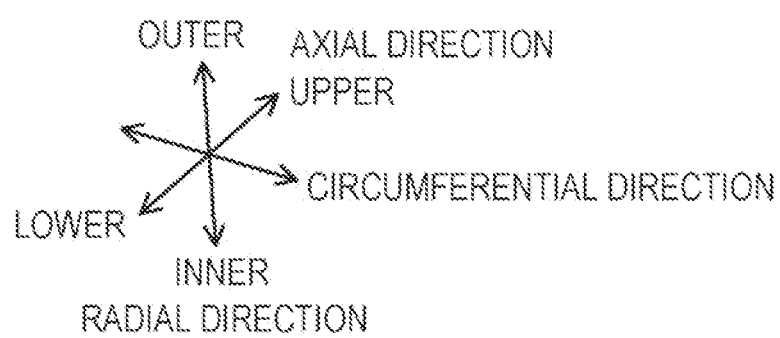

COIL, STATOR COMPRISING SAME, AND MOTOR

CROSS-REFERENCE TO RELATED APPLICATIONS

This application is a U.S. national stage application of the PCT International Application No. PCT/JP2021/016750 filed on Apr. 27, 2021, which claims the benefit of foreign priority of Japanese patent application 2020-094713 filed on May 29, 2020, the contents all of which are incorporated herein by reference.

TECHNICAL FIELD

The present disclosure relates to a coil, a stator including the coil, and a motor.

BACKGROUND ART

In recent years, a demand for motors has increased in industrial and vehicular applications. In particular, the motors are desired to be improved in efficiency and be reduced in cost.

As one of the methods for improving efficiency of a motor, it is known that a space factor of a coil disposed in a slot of a stator is improved. An increase in the space factor of a coil enables reduction in loss due to a current flowing through the coil when the motor is driven.

As a method for improving the space factor of a coil, there is proposed a configuration in which a cast coil made of a copper material is disposed in a slot (see PTL 1, for example).

In the configuration as disclosed in PTL 1, a molded body in which a strand is wound in a spiral shape is formed by casting, and an insulating film is formed on a surface of the molded body to complete a coil. At this time, the insulating film is formed by electrodeposition coating.

CITATION LIST

Patent Literature

PTL 1: German Patent Application Publication No. DE102012212637

SUMMARY

However, in general, a formation speed of an insulating film by electrodeposition coating is low, and, in addition, manufacturing equipment is high in cost. Therefore, with respect to the configuration of the coil in which an insulating film is formed by electrodeposition coating, there is a problem that manufacturing cost is increased. The insulating film formed by electrodeposition coating has a large variation in film thickness. Therefore, in order to ensure a predetermined insulation withstand voltage, it is necessary to set a target value of the film thickness of the insulating film to be large. However, this is a factor of further increasing the manufacturing cost of a coil.

The present disclosure has been made in view of the above points. An object of the present disclosure is to provide a coil capable of reducing the manufacturing cost of an insulating film, a stator including the coil, and a motor.

To achieve the above object, a coil according to the present disclosure includes: a strand-wound body including stacked n turns of a wound strand that is made of a conductor and has a quadrangular cross-section, where n is a natural number; and an insulating resin covering a surface of the strand-wound body. A surface of an i-th turn, of the strand-wound body, having a ring shape is covered with the insulating resin, where i is an integer and $1 \le i \le n$, and the insulating resin is formed continuously and integrally in a first turn to an n-th turn of the strand-wound body.

Preferably, in at least a j-th turn of the strand-wound body, where j is an integer and $2 \le j \le n-1$, there are provided one or a plurality of grooves that extend from an outer peripheral surface to an inner peripheral surface of the strand-wound body, and the one or the plurality of grooves are filled with the insulating resin.

Preferably, the i-th turn has a quadrangular ring shape having four side portions. In the i-th turn, each of the four side portions has a surface covered with the insulating resin, and one or a plurality of the grooves are provided in each of the four side portions included in at least the j-th turn.

Preferably, each of the grooves has a tapered shape at least one of whose width and depth changes from the outer peripheral surface to the inner peripheral surface of the strand-wound body.

Preferably, in at least a j-th turn of the strand-wound body, where j is an integer and $2 \le j \le n-1$, there are provided a plurality of grooves. Each of the plurality of grooves has both ends provided on an outer peripheral surface of the j-th turn, and the plurality of grooves are filled with the insulating resin.

The following configuration may be employed. The i-th turn has a quadrangular ring shape having four side portions. In the i-th turn, each of the four side portions has a surface covered with the insulating resin, and one or a plurality of the grooves are provided in each side portion of one pair or two pairs of mutually opposing side portions of the four side portions included in the at least the j-th turn. The one or plurality of the grooves extend from a first end to a second end of the each side portion.

Preferably, each of the grooves has a tapered shape at least one of whose width and depth changes from the first end to the second end of one of the side portions.

The following configuration may be employed. At least one of the outer peripheral surface and the inner peripheral surface of the strand-wound body is further provided with another groove extending along a stacking direction of the strand, and the other groove is connected to one end of one of the grooves.

The following configuration is preferable. The i-th turn has a quadrangular ring shape having four side portions. In the i-th turn, each of the four side portions has a surface covered with the insulating resin. At least four corners of an outer peripheral surface of each of two turns mutually adjacent in a stacking direction of the strand are each provided with a recess that is recessed from an outer peripheral surface toward an inner peripheral surface of the strand-wound body. The insulating resin provided between the two turns has a thickness less than or equal to a width of the recesses along the stacking direction.

The following configuration may be employed. The i-th turn, where i is an integer and $1 \le i \le n$, has a quadrangular ring shape having four side portions. In the i-th turn, each of the four side portions has a surface covered with the insulating resin. In two turns mutually adjacent in a stacking direction of the strand, at least one of an upper side and a lower side of the outer peripheral surface of the side portion has a shape of being chamfered from a first end to a second end of the side portion.

A stator according to the present disclosure includes: a stator core having a tooth portion; and a coil including: a strand-wound body configured with stacked n turns of a wound strand that is made of a conductor and has a quadrangular cross-section, where n is a natural number; and an insulating resin covering a surface of the strand-wound body. The insulating resin is formed to continuously cover at least an outer peripheral surface and an inner peripheral surface of the strand-wound body and both end surfaces of the strand-wound body in a stacking direction of the strand, and an insulating member is provided between mutually adjacent turns.

The following configuration may be employed. The stator includes: a stator core having a tooth portion; and the above-described coil. The insulating resin is formed to continuously cover an outer peripheral surface and an inner peripheral surface of the strand-wound body and both end surfaces of the strand-wound body in a stacking direction of the strand.

The insulating member provided between mutually adjacent turns may include a member different from the insulating resin.

The insulating member may be insulating paper.

Preferably, a plurality of the insulating members are provided between mutually adjacent turns with an interval between each other.

The coil may be adhered to the tooth portion while the insulating resin provided on the inner peripheral surface of the coil is in contact with a surface of the tooth portion.

Preferably, the insulating resin provided on the inner peripheral surface of the coil is thicker than the insulating resin provided on the outer peripheral surface of the coil or than the insulating resin provided on either one of both end surfaces of the coil in the stacking direction of the strand.

A motor according to the present disclosure includes at least: a rotor including an output shaft at an axial center; and the above-described stator provided coaxially with the rotor and at a predetermined interval from the rotor.

The coil of the present disclosure can greatly reduce manufacturing cost of a coil, particularly, cost for forming the insulating film on the surface of a strand-wound body. The stator of the present disclosure can reduce manufacturing cost of the stator. The motor of the present disclosure can reduce manufacturing cost of the motor.

BRIEF DESCRIPTION OF THE DRAWINGS

FIG. 2 is a perspective view of a coil.

FIG. 3 is a perspective view of a strand-wound body.

FIG. 6A is a schematic view of a tooth and a strand-wound body set in a mold as viewed from an axial direction.

FIG. 7 is a schematic cross-sectional view of a main part of a stator.

FIG. 8 is a perspective view of a coil for comparison.

FIG. 9 is a perspective view of a first strand-wound body according to a first modification.

FIG. 10 is a perspective view of a second strand-wound body according to the first modification.

FIG. 11 is a perspective view of a third strand-wound body according to the first modification.

FIG. 12 is a perspective view of a fourth strand-wound body according to the first modification.

FIG. 15 is a perspective view of a strand-wound body according to a fourth modification.

DESCRIPTION OF PREFERRED EMBODIMENTS

Hereinafter, exemplary embodiments of the present disclosure will be described in detail with reference to the drawings. The following description of preferable exemplary embodiments is merely illustrative in nature and are not intended to limit the present disclosure, application thereof, or use thereof.

First Exemplary Embodiment

[Configuration of Motor]

Figure 1:
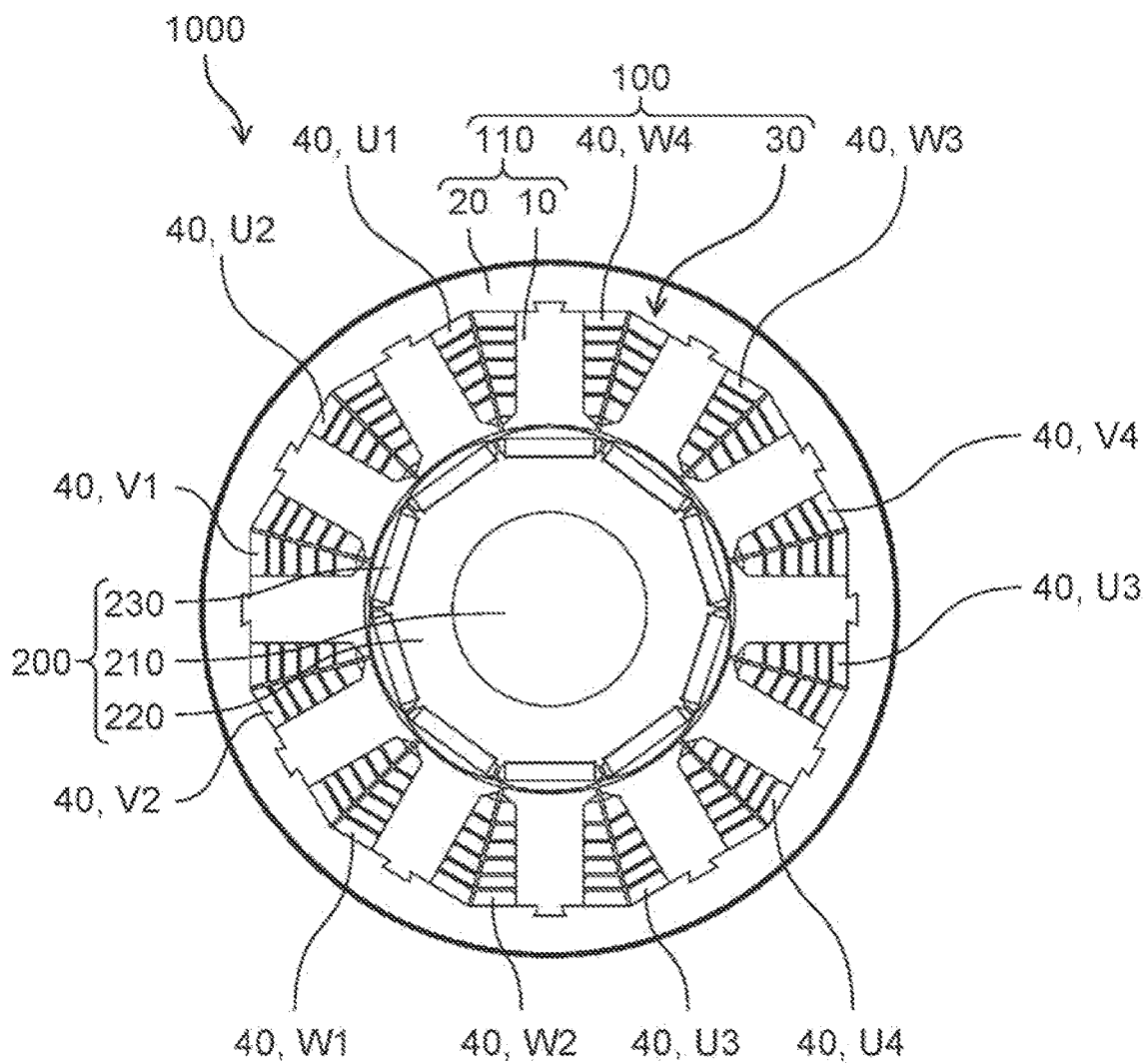
FIG. 1 is a schematic view of a motor according to a first exemplary embodiment.

FIG. 1 is a schematic view of motor 1000 according to a first exemplary embodiment. In the following description, a radial direction of motor 1000 may be referred to as a "radial direction", an outer circumferential direction thereof may be referred to as a "circumferential direction", and an axis line direction of output shaft 210 of motor 1000 (a direction perpendicular to the paper surface in FIG. 1) may be referred to as an "axial direction". In the radial direction, an axial center side of motor 1000 may be referred to as inner or an inner side, and an outer peripheral side may be referred to as outer or an outer side. When viewed from the axial direction, motor 1000 has an axial center coinciding with an axis line of output shaft 210.

Motor 1000 includes stator 100 and rotor 200. Although motor 1000 includes components other than the above components, such as a motor case and bearings that rotatably support output shaft 210, those components are not illustrated or described for convenience of description.

Stator 100 includes: yoke 20 having an annular ring shape; and a plurality of teeth (tooth portions) 10 connected to an inner periphery of yoke 20 and provided at equal intervals along the inner periphery. Yoke 20 to which teeth 10 are connected may be referred to as stator core 110.

Stator 100 further includes: slots 30 provided between teeth 10 adjacent to each other in the circumferential direction; and coils 40 contained in slots 30. Stator 100 is disposed on the radially outer side of rotor 200 with a predetermined interval between stator 100 and rotor 200.

Teeth 10 and yoke 20 are each formed, for example, by blanking electromagnetic steel sheets containing silicon and the like and then stacking. Coils 40 are each attached to one of the plurality of teeth 10 and are housed in slots 30. The shape of coils 40 will be described in detail later.

In the present exemplary embodiment, in some cases, coils 40 are each referred to as one of coils U1 to U4, coils V1 to V4, and coils W1 to W4, depending on phases of currents flowing through coils 40.

Rotor 200 includes: output shaft 210; rotor core 220 having output shaft 210 at the axial center of rotor 200; and magnets 230 that are embedded in rotor core 220 to face stator 100 while N poles and S poles of magnets 230 are alternately disposed along the outer circumferential direction of output shaft 210. It is possible to appropriately change material, shape, and properties of magnets 230, depending on an output of motor 1000 and the like. Rotor core 220 is formed, for example, by blanking electromagnetic steel sheets containing silicon and the like and then stacking.

Coils U1 to U4 are connected in series, coils V1 to V4 are connected in series, and coils W1 to W4 are connected in series. Coils U1 to U4, V1 to V4, and W1 to W4 are respectively supplied with three phase currents of U, V, and W phases that are different from each other in phase by an electrical angle of 120°, so that a rotating magnetic field is generated in stator 100. The rotating magnetic field and a magnetic field generated by magnets 230 provided in rotor 200 interact with each other to generate torque, and output shaft 210 is therefore rotated while being supported by bearings (not illustrated).

Note that, in the present disclosure, similar functions and effects can be obtained even in such a configuration in stator 100 that coils U1 to U4 are connected in parallel, coils V1 to V4 are connected in parallel, and coils W1 to W4 are connected in parallel or in another connection configuration.

[Configuration of Coil]

Figure 4:
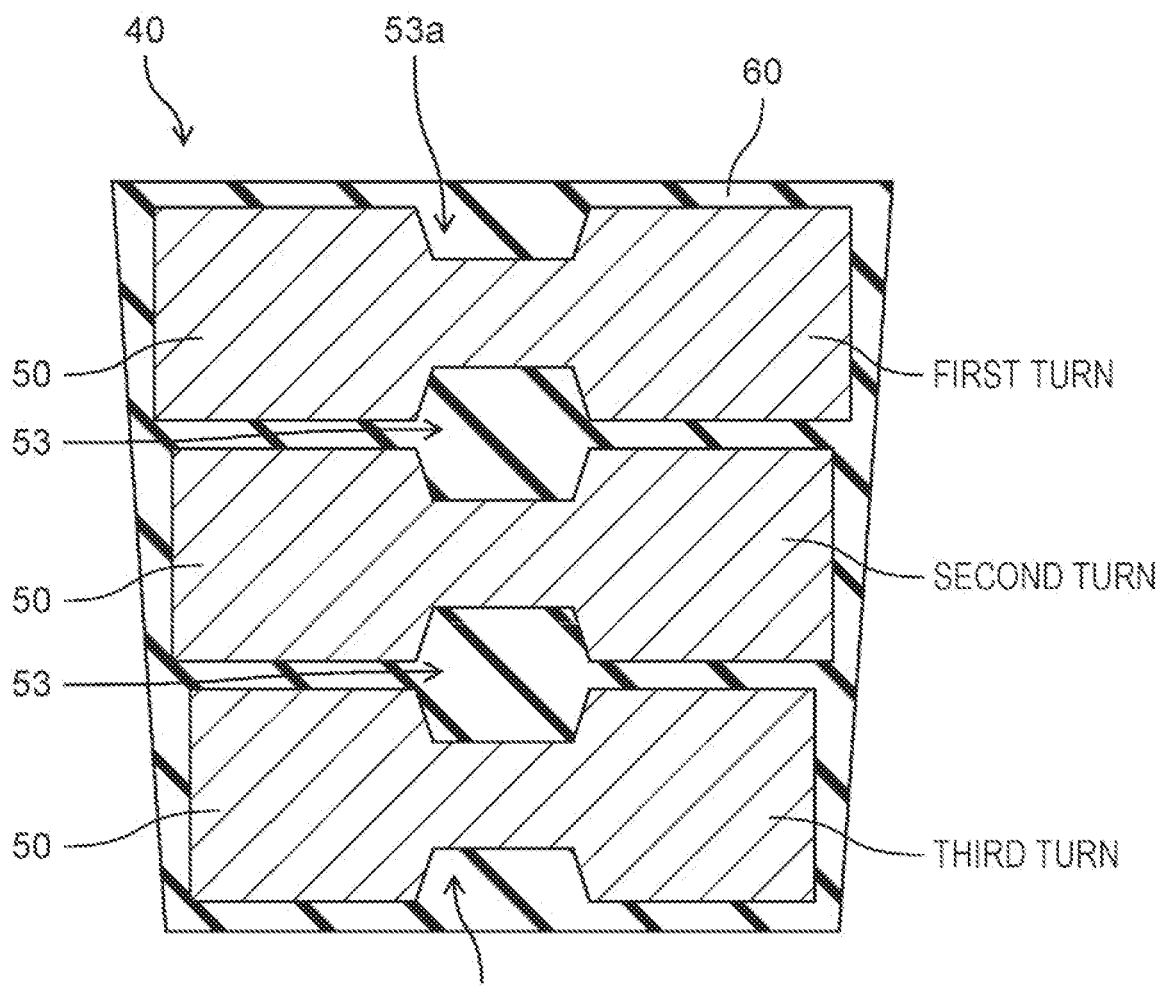
FIG. 4 is a cross-sectional view taken along line IV-IV in FIG. 2.

FIG. 2 is a perspective view of a coil. FIG. 3 is a perspective view of a strand-wound body. FIG. 4 is a cross-sectional view taken along line IV-IV in FIG. 2. With respect to coil 40 and strand-wound body 50, the side on which lead portion 52 is provided in the axial direction may be referred to as upper or as an upper side, and the opposite side may be referred to as lower or as a lower side.

As illustrated in FIG. 2, coil 40 includes: strand-wound body 50 in which a strand made of a conductor having a quadrangular cross-section is spirally wound and a plurality of turns of the strand are stacked; and insulating resin 60 covering a surface of strand-wound body 50. For convenience of description, illustrated strand-wound body 50 has three turns, but the number of turns does not have to be three but may be n turns, where is a natural number. A cross-section of coil 40 has only to be substantially quadrangular. Specifically, even if a cross-section of coil 40 has a shape in which corner portions are chamfered, the same operations and effects as those of the present disclosure can be obtained.

Strand-wound body 50 includes not only a wound body in which a strand having a constant width and thickness is spirally wound but also a "molded body".

The "molded body" in the present specification includes, for example, a molded body formed through the following steps. For example, a plurality of rectangular or L-shaped metal plate having different lengths, widths, or thicknesses are prepared, and these plates are subjected to pressing, cold welding, welding, or other method and are jointed, whereby a molded body is formed. A material for the plates is a low-resistance material such as copper or aluminum.

Alternatively, the molded body may be formed by so-called casting in which copper or the like is melted and poured into a mold. The molded body may be formed by bending, at a predetermined position, a plate-shaped strand that is previously formed to have a width or thickness that differs in the middle. Alternatively, a plate-shaped strand having a constant width and thickness is subjected to rolling at a predetermined position so as to change the width or thickness in the middle, and the strand is then spirally wound to form the molded body. In short, the molded body is formed by other additional processing than winding of a strand, or the molded body is formed by a method different from simply winding a strand.

As illustrated in FIG. 3, each turn of strand-wound body 50 has a quadrangular ring shape having four side portions 51. Both end portions of strand-wound body 50 are lead portions 52 that are not covered with insulating resin 60. Each of lead portions 52 is connected to a bus bar or a wiring line (not illustrated), and is electrically connected to another coil 40 or an external power supply (not illustrated).

In a central part of each of four side portions 51 there is formed groove 53a, 53b. Grooves 5a are formed in radially outer peripheral surfaces of side portions 51, and grooves 53b are formed in radially inner peripheral surfaces of side portions 51. In mutually adjacent turns, one of grooves 53a and one of groove 53b are disposed to face each other to form one groove 53. That is, each of four side portions 51 included in the i-th turn, where i is an integer and $1 \leq i \leq n$, there are formed grooves 53a, 53b from an outer peripheral surface to an inner peripheral surface of strand-wound body 50.

As illustrated in FIG. 4, insulating resin 60 is continuously and integrally formed so as to cover the entire surface of strand-wound body 50 including spaces between the turns and the inside of grooves 53. In other words, insulating resin 60 formed on the surface of each of the first turn to the n-th turn of strand-wound body 50 is formed in a single body. As will be described later, strand-wound body 50 is set in mold 300 (see FIG. 5), and molten resin is injected to form insulating resin 60 on the surface of strand-wound body 50. As insulating resin 60, for example, a thermoplastic resin such as acrylonitrile butadiene styrene (ABS) resin is used without being particularly limited thereto, and the type of insulating resin 60 can be appropriately changed.

[Method for Manufacturing Stator]

Figure 5:
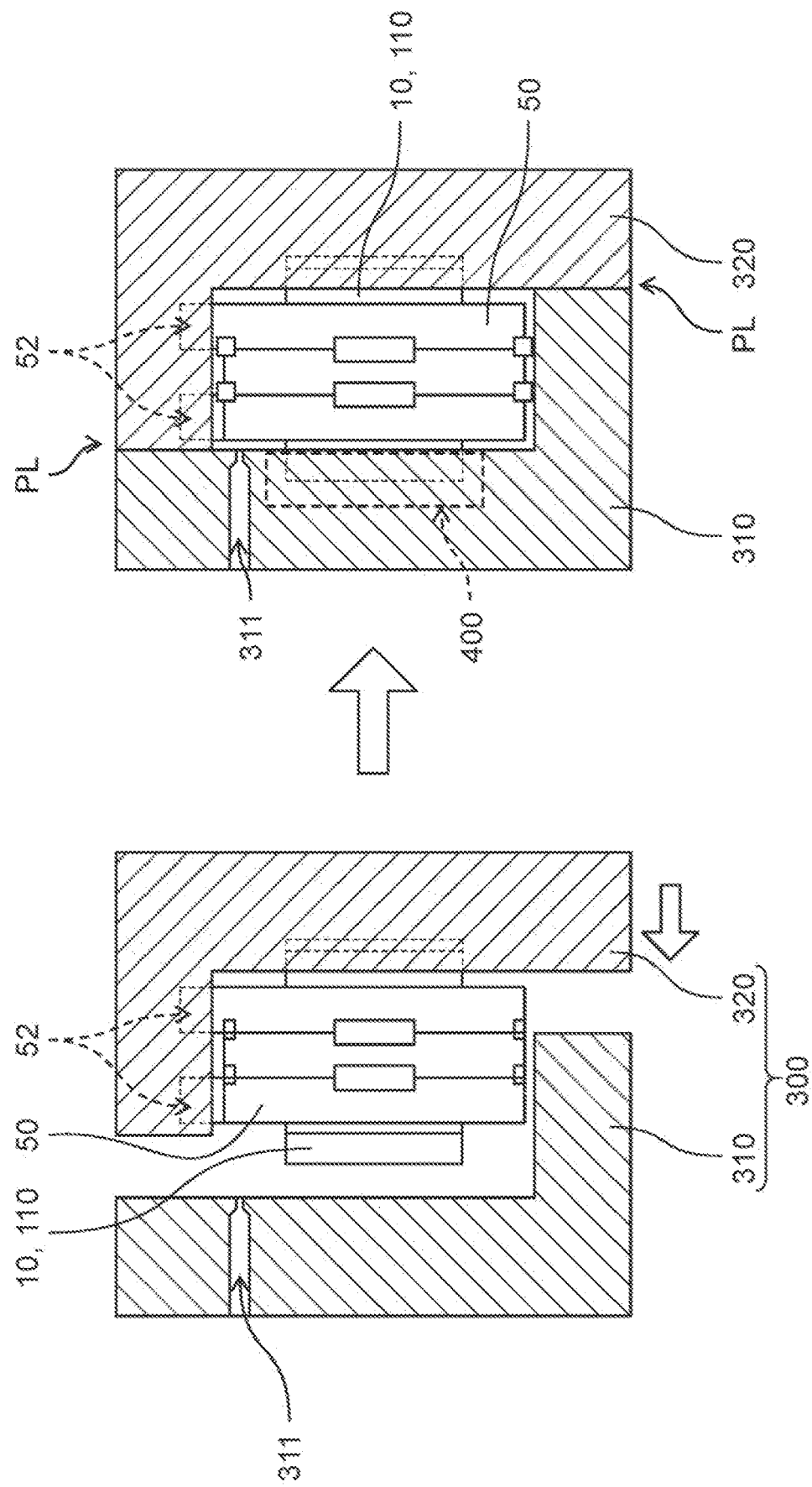
FIG. 5 is an explanatory diagram of an insulator coating step.
Figure 6B:
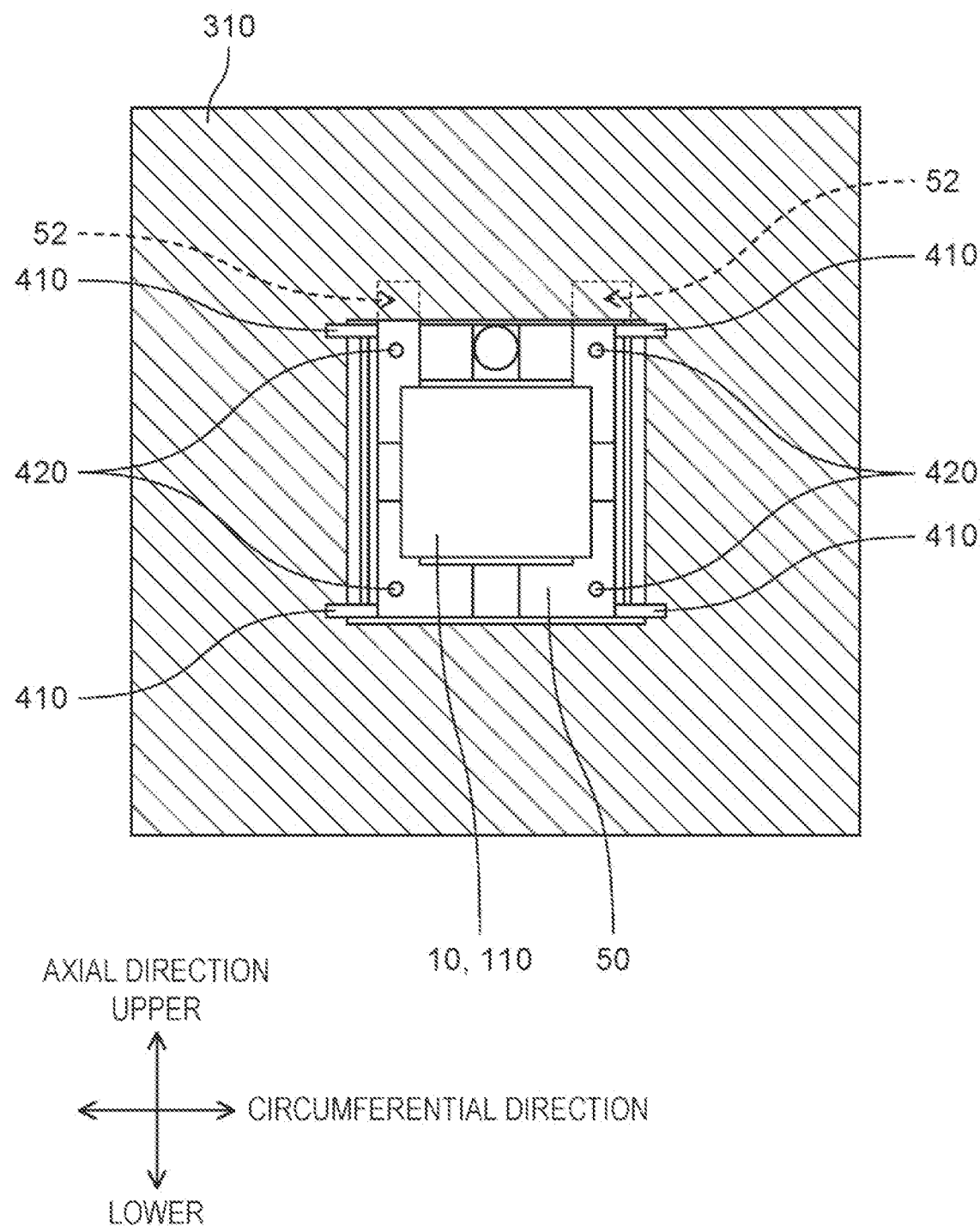
FIG. 6B is a schematic view of the tooth and the strand-wound body set in the mold as viewed from the radially inner side.

FIG. 5 is an explanatory diagram of an insulator coating step. FIG. 6A is a schematic view of a tooth and a strand-wound body set in a mold as viewed from the axial direction. FIG. 6B is a schematic view of the tooth and the strand-wound body set in the mold as viewed from the radially inner side. Each direction illustrated in FIGS. 6A and 6B is the direction when tooth 10 is incorporated in motor 1000.

Hereinafter, a method of manufacturing stator 100 will be described with reference to the drawings. First, strand-wound body 50 in which grooves 53 are formed is prepared, and strand-wound body 50 is attached to tooth 10.

Next, as illustrated on the left side of FIG. 5, tooth 10 to which strand-wound body 50 is attached is set in mold 300. Mold 300 is of an ordinary split type. Mold 300 is divided into cavity 310 as a fixed portion and core 320 as a movable portion. Injection path 311 for resin is provided in cavity 310.

Tooth 10 is set at a predetermined position of core 320, and is fixedly held by slide core 400. Lead portions 52 of strand-wound body 50 are also positioned and are then held by core 320. In this state, core 320 moves toward cavity 310, and cavity 310 and core 320 come into contact with each other at parting line PL, whereby strand-wound body 50 and tooth 10 are sealed in mold 300.

At this time, as illustrated in FIGS. 6A and 6B, positioning pins 420 and slide cores 410 are brought into contact with predetermined positions of strand-wound body 50, for example, recesses 56 to be described later (see FIG. 17), so that strand-wound body 50 is positioned with respect to tooth 10, and, at the same time, a predetermined interval is provided between the inner peripheral surface of strand-wound body 50 and a surface of tooth 10.

Next, molten thermoplastic resin is poured from injection path 311, and strand-wound body 50 and the tooth 10 are molded with resin. At this time, the resin enters grooves 53 of strand-wound body 50, and spaces between turns mutually adjacent in the radial direction are widened by an inflow pressure of the resin, and the resin goes around so as to cover the entire surface of the strand wound portion. The resin does not fill parts of lead portion 52 held by core 320.

After waiting until the temperature becomes a predetermined temperature or lower after the resin injection, core 320 is moved away from cavity 310. Strand-wound body 50 and tooth 10 are removed from core 320, thereby completing the insulator coating step on strand-wound body 50, and coil 40 is completed. This process is a so-called insert molding process. The followings are set so as to avoid residual burrs of insulating resin 60 on coil 40 as much as possible: shapes of cavity 310 and core 320; setting positions of tooth 10 and strand-wound body 50 on core 320; and a position and shape of parting line PL.

FIG. 7 is a schematic cross-sectional view of a main part of the stator. The structure illustrated in FIG. 7 is a structure after the insulator coating step is finished.

As illustrated in FIG. 7, insulating resin 60 is made to fill between the inner peripheral surface of strand-wound body 50 and the surface of tooth 10, and is formed so as to integrally cover strand-wound body 50 and tooth 10. That is, insulating resin 60 provided on the inner peripheral surface of strand-wound body 50 is in contact with the surface of tooth 10, whereby coil 40 is fixed to tooth 10.

Insulating resin 60 is formed so as to continuously cover the spaces between mutually adjacent turns of strand-wound body 50, the outer peripheral surface and the inner peripheral surface of strand-wound body 50, and both end surfaces of strand-wound body 50 in the radial direction, which is the stacking direction of the strand.

Effects and the Like

As described above, coil 40 according to the present exemplary embodiment includes at least: strand-wound body 50 including stacked n turns of a wound strand that is made of a conductor and has a quadrangular cross-section, where n is a natural number; and insulating resin 60 covering a surface of strand-wound body 50.

The i-th turn has a quadrangular ring shape having four side portions 51, and in the i-th turn, insulating resin 60 covers a surface of each of four side portions 51. In the first turn to the n-th turn, insulating resin 60 is continuously and integrally formed.

In each of four side portions 51 included in the i-th turn, there are provided grooves 53a, 53b that extend from an outer peripheral surface to an inner peripheral surface of strand-wound body 50. Insulating resin 60 is formed so as to cover the surface of each of four side portions 51 and to fill grooves 53 or 53a or 53b.

By configuring coil 40 as described above, it is possible to greatly reduce manufacturing cost of coil 40, particularly, cost for forming an insulating film on the surface of strand-wound body 50.

As described above, coil 40 of the present exemplary element includes at least: strand-wound body 50 including stacked n turns of a wound strand that is made of a conductor and has a quadrangular cross-section, where n is a natural number; and insulating resin 60 covering a surface of strand-wound body 50. A surface of an i-th turn, of strand-wound body 50, having a ring shape is covered with insulating resin 60, where i is an integer and $1 \leq i \leq n$, and insulating resin 60 is formed continuously and integrally in a first turn to an n-th turn of strand-wound body 50. With this configuration, coil 40 of the present disclosure can greatly reduce the manufacturing cost of coil 40, particularly, the cost for forming the insulating film on the surface of strand-wound body 50.

FIG. 8 is a perspective view of coil 40A for comparison. A configuration of coil 40A illustrated in FIG. 8 corresponds to, for example, a conventional configuration disclosed in PTL 1.

In coil 40A illustrated in FIG. 8, grooves 53a, 53b illustrated in FIGS. 2 to 4 are not formed in strand-wound body 50A. When insulating resin 60 is formed on a surface of strand-wound body 50A by the above-described method, since spaces between mutually adjacent turns in the radial direction is made small, a molten resin having a predetermined viscosity is less likely to enter the spaces between the turns. Therefore, insulating resin 60 is not formed to have a desired thickness between adjacent turns. Alternatively, insulating resin 60 varies in thickness. This may cause insulation failure of coil 40A.

On the other hand, according to the present exemplary embodiment, in each of four side portions 51 included in the i-th turn, there are provided grooves 53a, 53b that extend from the outer peripheral surface to the inner peripheral surface of strand-wound body 50. As a result, the molten resin easily enters grooves 53 in the insulator coating step. Further, due to the inflow pressure of the resin, the spaces between adjacent turns are expanded, and the molten resin sufficiently enters. As a result, the entire surface of strand-wound body 50 can be reliably covered with insulating resin 60. Therefore, occurrence of insulation failure of coil 40 can be prevented or reduced.

In addition, since the entire surface of strand-wound body 50 can be coated with insulating resin 60 by known insert molding method, the manufacturing cost of the insulating film can be reduced, and, as a result, the manufacturing cost of coil 40 can be reduced.

In the present exemplary embodiment, the description has been made taking, as an example, the case where the i-th turn of strand-wound body 50 has a quadrangular ring shape, but the present exemplary element is not particularly limited to this example. The configuration may be made such that the i-th turn is formed in a ring shape including an annular ring shape, a regular polygonal ring shape, or the like and such that the surface of each of the first turn to the n-th turn may be covered with insulating resin 60. Also in this case, in the first turn to the n-th turn, insulating resin 60 is continuously and integrally formed. That is, in the first turn to the n-th turn, insulating resin 60 is formed in a single body. In this case, grooves 53 are preferably provided at such positions that grooves 53 face each other in the radial direction and sandwich a virtual axis line that passes through the center of strand-wound body 50 and extends in the axial direction.

Stator 100 includes at least stator core 110 having teeth (tooth portions) 10 and coils 40.

Insulating resin 60 is formed so as to integrally cover strand-wound body 50 and tooth (tooth portion) 10. Further, insulating resin 60 is formed so as to continuously cover the spaces between mutually adjacent turns of strand-wound body 50, the outer peripheral surface and the inner peripheral surface of strand-wound body 50, and both end surfaces of strand-wound body 50 in the radial direction, which is the stacking direction of the strand.

By configuring stator 100 as described above, the insulator coating step in the manufacturing process of coil 40 and a part of the assembling process of stator 100 can be commonly used, and the manufacturing cost of stator 100 can be reduced. In addition, insulation failure of coil 40 can be reduced, and the reliability of stator 100 can be improved.

Insulating resin 60 provided on the inner peripheral surface of strand-wound body 50 is in contact with the surface of tooth 10, whereby coil 40 is fixed to tooth 10.

This configuration makes it possible to omit an insulator (not illustrated) for electrically insulating between stator core 110 including teeth 10 and coils 40, thereby reducing the cost of stator 100. From the viewpoint of ensuring electric insulation, insulating resin 60 provided on the inner peripheral surface of coil 40 is preferably formed to be thicker than insulating resin 60 provided on the outer peripheral surface of coil 40 or than insulating resin 60 provided on either one of both end surfaces of coil 40 in the stacking direction of the strand.

However, depending on a size of slot 30 or required specifications about insulation characteristics between stator core 110 and coil 40, insulating resin 60 may be formed by the above-described method after strand-wound body 50 is attached to tooth 10 to which the above-described insulator is attached.

It is also possible to previously forming coil 40 by covering strand-wound body 50 with insulating resin 60 and then to attach coil 40 to tooth 10. The above-mentioned insulator may be previously attached to tooth 10 when coil 40 is attached.

Yoke 20 may be split into a plurality of parts in the circumferential direction. In this case, tooth 10 to which coil 40 is attached is connected to each of the split yokes (not shown). Further, the split yokes are connected to one another in the circumferential direction to complete stator 100.

In the case where the split yokes are used, insulating resin 60 may be formed after the split yoke to which tooth 10 is connected and strand-wound bodies 50 are set in mold 300 illustrated in FIGS. 5, 6A, and 6B. This method can increase the degree of freedom in the process of assembling stator 100.

Stator 100 according to the present exemplary embodiment includes: stator core 110 having tooth 10; and coil 40 that includes: strand-wound body 50 configured with stacked n turns of a wound strand that is made of a conductor and has a quadrangular cross-section, where n is a natural number; and insulating resin 60 covering a surface of strand-wound body 50. Insulating resin 60 is formed to continuously cover at least an outer peripheral surface and an inner peripheral surface of strand-wound body 50 and both end surfaces of strand-wound body 50 in a stacking direction of the strand, and an insulating member is provided between mutually adjacent turns. With stator 100 of the present exemplary embodiment, the manufacturing cost of stator 100 can be reduced.

Motor 1000 according to the present exemplary embodiment includes at least: rotor 200 having output shaft 210 at the axial center of rotor 200; and stator 100 provided coaxially with rotor 200 and at a predetermined interval from rotor 200.

By configuring motor 1000 as described above, the cost of stator 100 and hence the cost of motor 1000 can be reduced. In addition, insulation failure of coil 40 can be reduced, and reliability of motor 1000 can be improved.

First Modification

FIG. 9 is a perspective view of a first strand-wound body according to a first modification. FIG. 10 is a perspective view of a second strand-wound body according to the first modification. FIG. 11 is a perspective view of a third strand-wound body according to the first modification. FIG. 12 is a perspective view of a fourth strand-wound body according to the first modification. In FIGS. 9 to 12 and in the subsequent drawings, parts similar to those of the first exemplary embodiment is denoted by the same reference marks, and detailed description thereof will be omitted.

A shape, number, and arrangement of the grooves provided in strand-wound body 50 are not particularly limited to the configuration described in the first exemplary embodiment, and can be variously changed as described in the present modification.

For example, as illustrated in FIG. 9, groove 53a (53) may be provided only in a radially outer peripheral surface of side portion 51 in the radial direction. In addition, as illustrated in FIG. 10, two grooves 53a, 53b may be provided in each of four side portions 51.

That is, in coil 40 according to the present disclosure, in at least each of four side portions 51 included in a j-th turn (j is an integer and 2≤j≤n−1), there are provided one or a plurality of grooves 53a, 53b that extend from the outer peripheral surface to the inner peripheral surface of strand-wound body 50. The number of grooves formed in one side portion 51 may be three or more.

In addition, as illustrated in FIG. 11, there may be provided other grooves 54c that extend in the stacking direction such that grooves 54c connect between the plurality of grooves 54a, 54b disposed apart from each other in the radial direction, which is the stacking direction of the strand. Grooves 54c are provided on each of the inner peripheral surface and the outer peripheral surface of strand-wound body 50. That is, grooves 54 are each configured with the following grooves: groove 54a and groove 54b facing each other in the radial direction; groove 54c connecting ends of grooves 54a, 54b on the outer peripheral side; and grooves 54c connecting ends of grooves 54a, 54b on the inner peripheral side.

By providing grooves 54, insulating resin 60 easily enters between mutually adjacent turns in the insulator coating step. Therefore, the entire surface of strand-wound body 50 can be reliably covered with insulating resin 60. As a result, insulation failure of coil 40 can be reliably reduced, and the reliability of stator 100 and hence the reliability of motor 1000 can be improved.

Provided grooves 54c decrease a cross-sectional area of the strand and accordingly increases an increase rate of electric resistance of coil 40. Therefore, a width and depth of grooves 54c can be appropriately changed depending on specifications of the electric resistance required for coil 40.

As illustrated in FIG. 10, also in a case where the number of grooves 53 is increased, the increase rate of the electric resistance of coil 40 increases similarly. Therefore, the width and depth of each groove can be appropriately changed depending on specifications of the electric resistance required for coil 40.

In the example illustrated in FIG. 11, in order to make insulating resin 60 enter easily, it is preferable to provide grooves 54c in any one of the outer peripheral surface and the inner peripheral surface of strand-wound body 50 into which insulating resin 60 flows. That is, grooves 54c each may be formed to be continuous to one ends of grooves 54a, 54b.

Alternatively, as illustrated in FIG. 12, grooves 55a, 55b may be provided on one of two pairs of mutually facing side portions 51 of four side portions 51 included in the i-th turn such that grooves 55a, 55b extend from one end to the other end of side portion 51. In this case, both ends of grooves 55a, 55b are provided on the outer peripheral surface of strand-wound body 50. In mutually adjacent turns, groove 55a and groove 55b are disposed to face each other to form one groove 55.

Also in the case where grooves 55 are formed as described above, insulating resin 60 easily enters between mutually adjacent turns. Therefore, the entire surface of strand-wound body 50 can be reliably covered with insulating resin 60. As a result, insulation failure of coil 40 can be reliably reduced. Therefore, the reliability of stator 100 and hence the reliability of motor 1000 can be improved.

The number of each of grooves 55a and grooves 55b formed in one side portion 51 may be two or more. Further, with respect to FIG. 12, in each of mutually facing side portions 51 in which no groove is provided, there may be provided grooves 55a, 55b that extend from one end to the other end of side portion 51. Also in this case, both ends of grooves 55a, 55b are provided on the outer peripheral surface of strand-wound body 50. The longitudinal direction of grooves 55a, 55b is preferably along the flow direction of the molten resin in mold 300. This configuration enables insulating resin 60 to enter more easily between mutually adjacent turns, and the entire surface of strand-wound body 50 can be reliably covered with insulating resin 60.

In the examples illustrated in FIGS. 9 to 11, the configuration may be made such that the i-th turn may be formed in an annular ring shape or a regular polygonal ring shape and such that the surface of each of the first turn to the n-th turn may be covered with insulating resin 60. In this case, grooves are preferably provided at such positions that the grooves face each other in the radial direction and sandwich a virtual axis line that passes through the center of strand-wound body 50 and extends in the axial direction.

As described above, in the coils of the present modification, the i-th turn has a quadrangular ring shape having four side portions. In the i-th turn, each of four side portions 51 has a surface covered with insulating resin 60, and one or a plurality of grooves 55a, 55b are provided in each side portion of one pair or two pairs of mutually opposing side portions of four side portions 51 included in the at least the j-th turn such that the one or the plurality of grooves 55a, 55b extend from the one end to the other end of the each side portion.

Grooves 55a, 55b may each have a tapered shape in which at least one of the width and depth changes from one end to the other end of side portion 51.

The following configuration may be employed. At least one of the outer peripheral surface and the inner peripheral surface of strand-wound body 50 is further provided with another groove 54C extending along a stacking direction of the strand, and another groove 54c is connected to one end of one of the grooves.

Second Modification

Figure 13A:
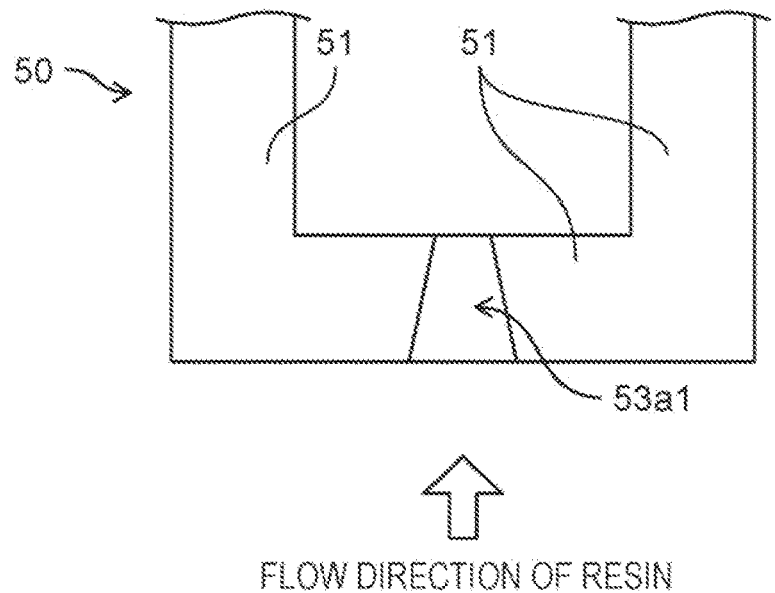
FIG. 13A is a top view of side portions of a strand-wound body according to a second modification.
Figure 13B:
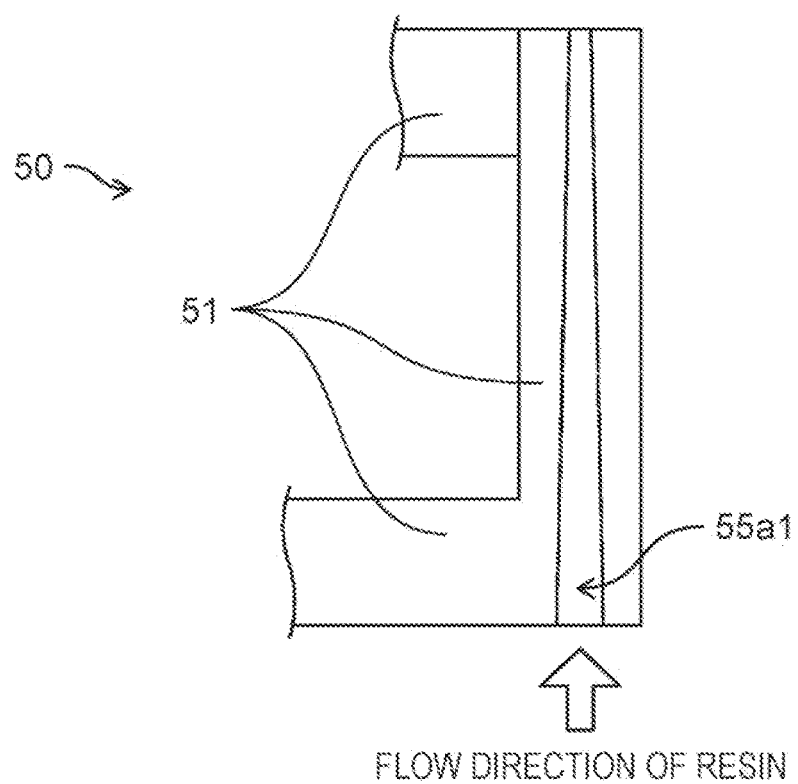
FIG. 13B is a top view of side portions of another strand-wound body according to the second modification.

FIG. 13A is a top view of side portions of a strand-wound body according to a second modification. FIG. 13B is a top view of side portions of another strand-wound body according to second modification. Groove 53a1 illustrated in FIG. 13A corresponds to grooves 53a illustrated in FIG. 2. Groove 55a1 illustrated in FIG. 13B corresponds to grooves 55a illustrated in FIG. 12.

In order to enable insulating resin 60 to enter easily between mutually adjacent turns of strand-wound body 50, shapes of groove 53a1 and 55a1 may be each made in a tapered shape whose width changes from the outer peripheral surface to the inner peripheral surface of strand-wound body 50 as illustrated in FIGS. 13A and 13B.

In the configuration illustrated in FIG. 13A, the following configuration is preferable. The width of groove 53a1 is widest on the outer peripheral surface of strand-wound body 50, which is an inflow surface of molten resin, and the width of groove 53a1 is narrower toward the inner peripheral surface. This configuration enables insulating resin 60 to enter easily between mutually adjacent turns, and the entire surface of strand-wound body 50 can be reliably covered with insulating resin 60. As a result, insulation failure of coil 40 can be reliably reduced, and the reliability of stator 100 and hence the reliability of motor 1000 can be improved.

In the case where the inflow surface of the molten resin is the inner peripheral surface of strand-wound body 50, it is needless to say that the following configuration is preferable. The width of groove 53a1 is widest on the inner peripheral surface, and the width of groove 53a1 is narrower toward the outer peripheral surface.

In the configuration illustrated in FIG. 13B, it is similarly needless to say that the following configuration is preferable. The width of groove 55a1 is widest at one end of groove 55a1 corresponding to the inflow surface of molten resin, and the width of the groove become narrower toward the other end.

In the configuration illustrated in FIG. 13A, the configuration may be made such that the i-th turn may be formed in an annular ring shape or a regular polygonal ring shape and such that the surface of each of the first turn to the n-th turn may be covered with insulating resin 60.

Third Modification

Figure 14A:
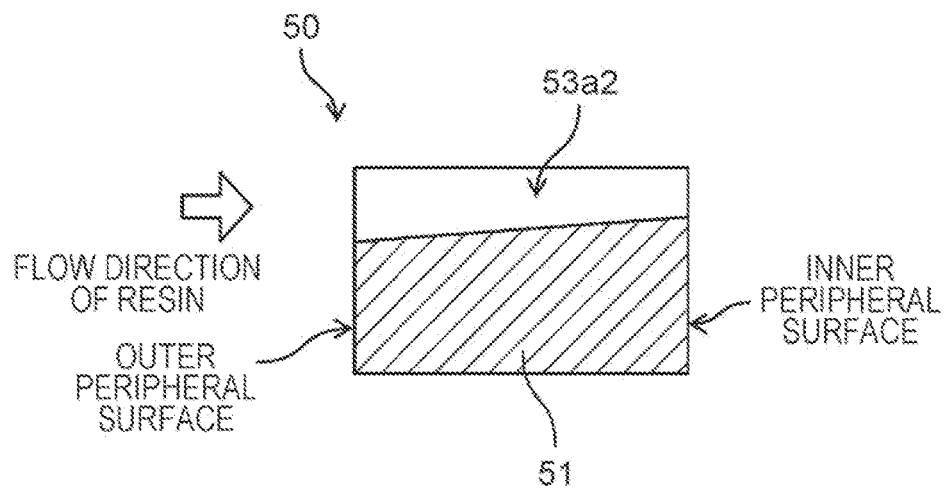
FIG. 14A is a schematic cross-sectional view of a side portion of a strand-wound body according to a third modification.
Figure 14B:
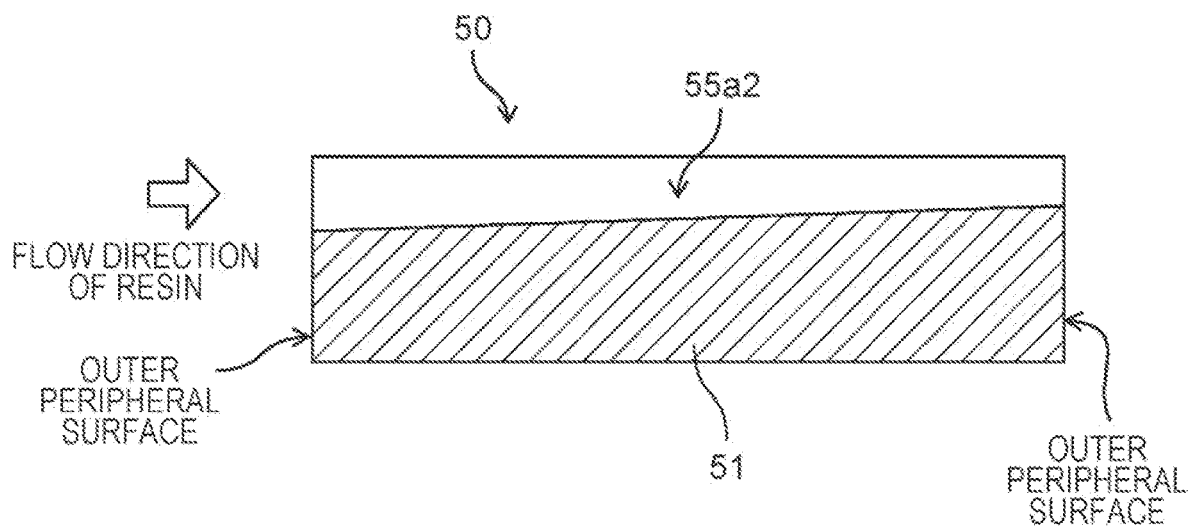
FIG. 14B is a schematic cross-sectional view of a side portion of another strand-wound body according to the third modification.

FIG. 14A is a schematic cross-sectional view of a side portion of a strand-wound body according to a third modification. FIG. 14B is a schematic cross-sectional view of a side portion of another strand-wound body according to the third modification. Groove 53a2 illustrated in FIG. 14A corresponds to grooves 53a illustrated in FIG. 2. Groove 55a2 illustrated in FIG. 14B corresponds to grooves 55a illustrated in FIG. 12.

In order to enable insulating resin 60 to enter easily between mutually adjacent turns of strand-wound body 50, the shapes of groove 53a2 and 55a2 each may be made in a tapered shape whose depth changes from the outer peripheral surface to the inner peripheral surface of strand-wound body 50 as illustrated in FIGS. 14A and 14B.

In the configuration illustrated in FIG. 14A, the following configuration is preferable. The depth of groove 53a2 is deepest on the outer peripheral surface of strand-wound body 50, which is the inflow surface of the molten resin, and the width of groove 53a2 is shallower toward the inner peripheral surface. This configuration enables insulating resin 60 to enter easily between mutually adjacent turns. Therefore, the entire surface of strand-wound body 50 can be reliably covered with insulating resin 60. As a result, insulation failure of coil 40 can be reliably reduced. Therefore, the reliability of stator 100 and hence the reliability of motor 1000 can be improved.

In the case where a surface through which the molten resin flows in is the inner peripheral surface of strand-wound body 50, it is needless to say that the following configuration is preferable. The depth of groove 53a2 is deepest on the inner peripheral surface, and the width of groove 53a2 is narrower toward the outer peripheral surface.

In the configuration illustrated in FIG. 14B, it is similarly needless to say that the following configuration is preferable. The depth of groove 55a2 is deepest at one end of groove 55a2 corresponding to the inflow surface of the molten resin, and the depth of the groove become shallower toward the other end.

In the configuration illustrated in FIG. 14A, the configuration may be made such that the i-th turn may be formed in an annular ring shape or a regular polygonal ring shape and such that the surface of each of the first turn to the n-th turn may be covered with insulating resin 60.

Fourth Modification

Figure 16:
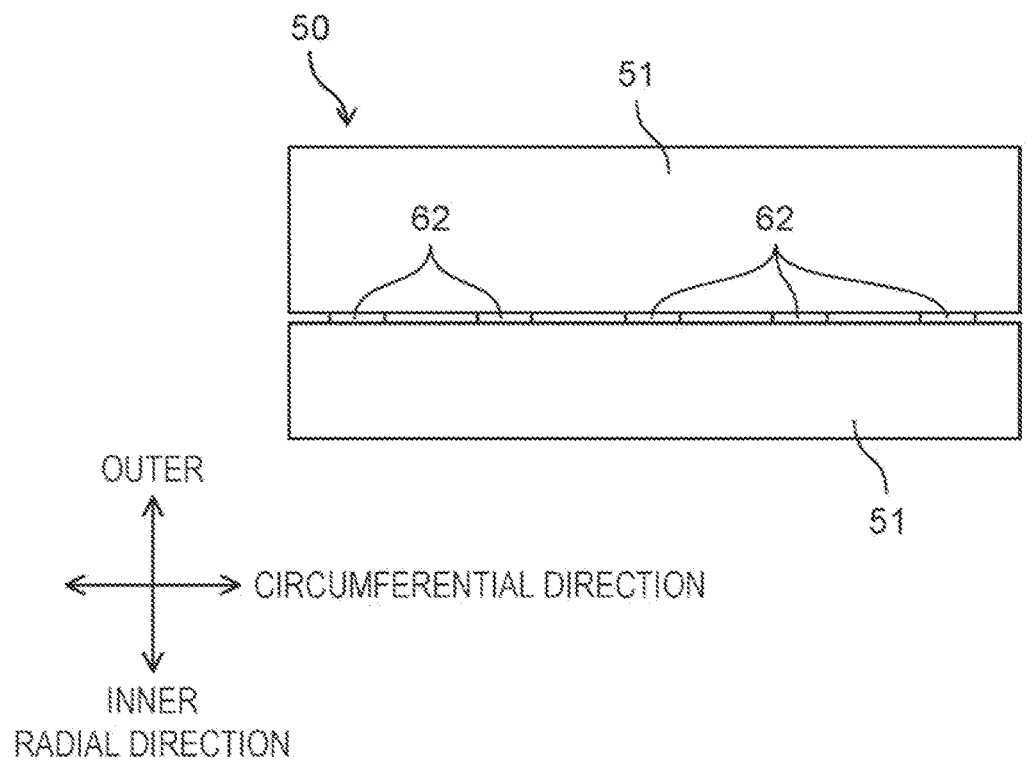
FIG. 16 is a partially enlarged view of another strand-wound body according to the fourth modification.

FIG. 15 is a perspective view of a strand-wound body according to a fourth modification. FIG. 16 is a partially enlarged view of another strand-wound body according to the fourth modification.

The configurations of the present modification illustrated in FIGS. 15 and 16 are different from the configuration illustrated in the first exemplary embodiment in that insulating members different from insulating resin 60 are provided between mutually adjacent turns of strand-wound body 50.

Depending on characteristic specifications required for stator 100 and restriction of the size of coil 40, a thickness of insulating resin 60, particularly, the thickness of insulating resin 60 provided between mutually adjacent turns of strand-wound body 50 is sometimes reduced, or a variation of the thickness is sometimes reduced. In such a case, as shown in the first exemplary embodiment, it is sometimes difficult to control the thickness of insulating resin 60 provided between mutually adjacent turns by way of an inflow pressure or an inflow amount of the molten resin.

According to the present modification, it is possible to address such a problem by providing an insulating member different from insulating resin 60 in advance between mutually adjacent turns of strand-wound body 50. For example, as illustrated in FIG. 15, insulating paper 61 may be sandwiched between mutually adjacent turns. That is, the insulating member may be insulating paper 61. Alternatively, as illustrated in FIG. 16, a plurality of dot-shaped insulators 62 may be provided at intervals between adjacent turns by a method such as inkjet printing. This configuration makes it possible to set the thickness of insulating resin 60 provided between mutually adjacent turns to a desired value.

On the surface of strand-wound body 50 illustrated in each of FIGS. 15 and 16, insulating resin 60 is formed by the method described in the first exemplary embodiment. Therefore, insulating resin 60 may enter between the dot-shaped insulators 62 illustrated in FIG. 16. This configuration can reliably prevent or reduce insulation failure of coil 40. Therefore, the reliability of stator 100 and hence the reliability of motor 1000 can be improved.

That is, in stator 100 according to the present disclosure, an insulating member is provided between mutually adjacent turns of strand-wound body 50. The insulating member may include only insulating resin 60, or may include an insulator member different from insulating resin 60 in addition to insulating resin 60.

The shape of the insulators 62 illustrated in FIG. 16 are not particularly limited. Insulators 62 may be formed by a potting method as long as the thickness can be controlled. Furthermore, the intervals between the insulators 62 can also be changed as appropriate.

In the present modification, the configuration may be made such that the i-th turn may be formed an annular ring shape or a regular polygonal ring shape and such that the surface of each of the first turn to the n-th turn may be covered with insulating resin 60.

Second Exemplary Embodiment

Figure 17:
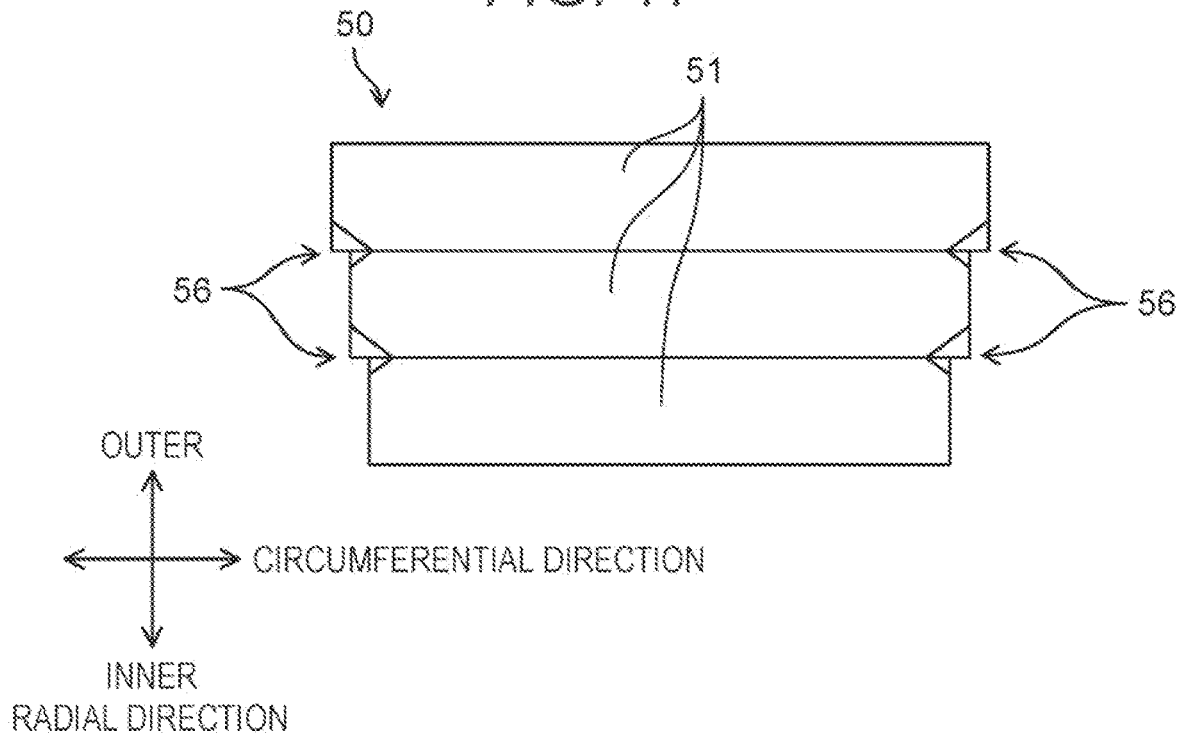
FIG. 17 is a side view of a strand-wound body according to a second exemplary embodiment.
Figure 18:
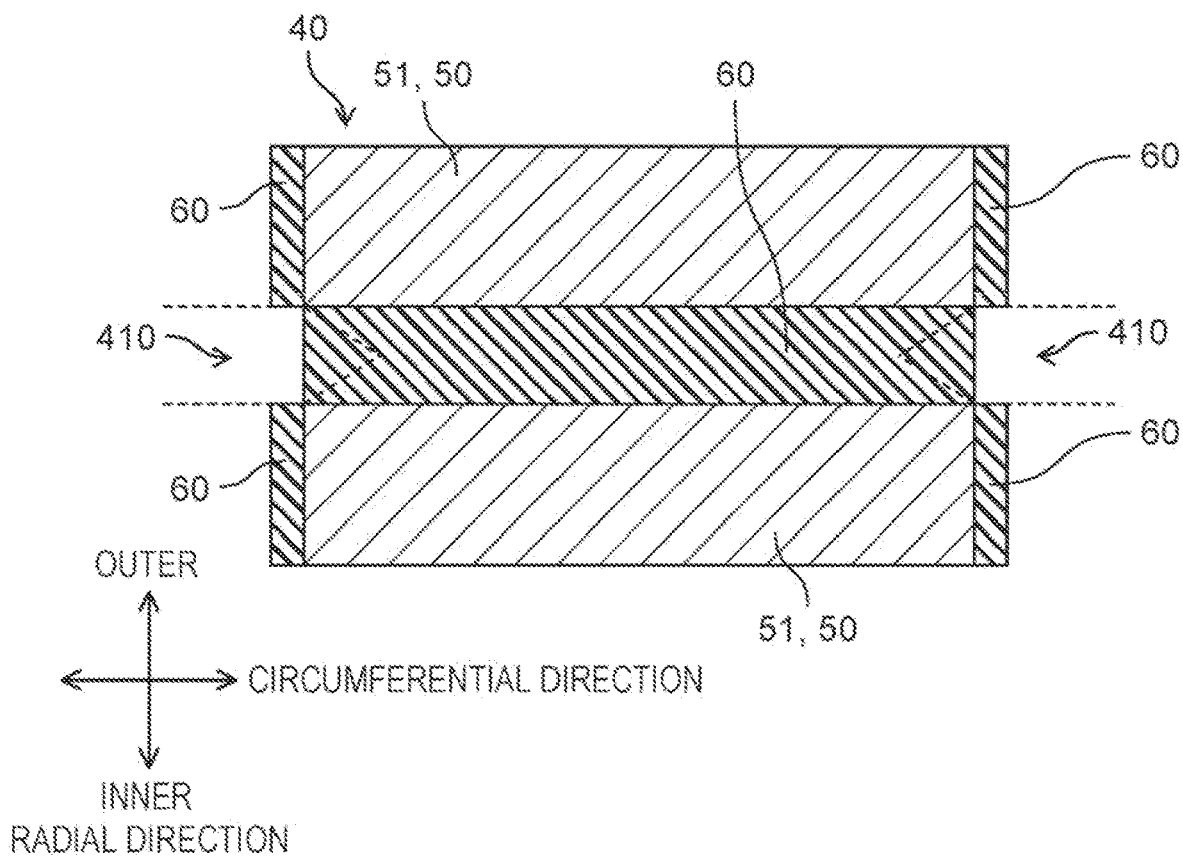
FIG. 18 is a partial cross-sectional view of a coil according to the second exemplary embodiment.
Figure 19:
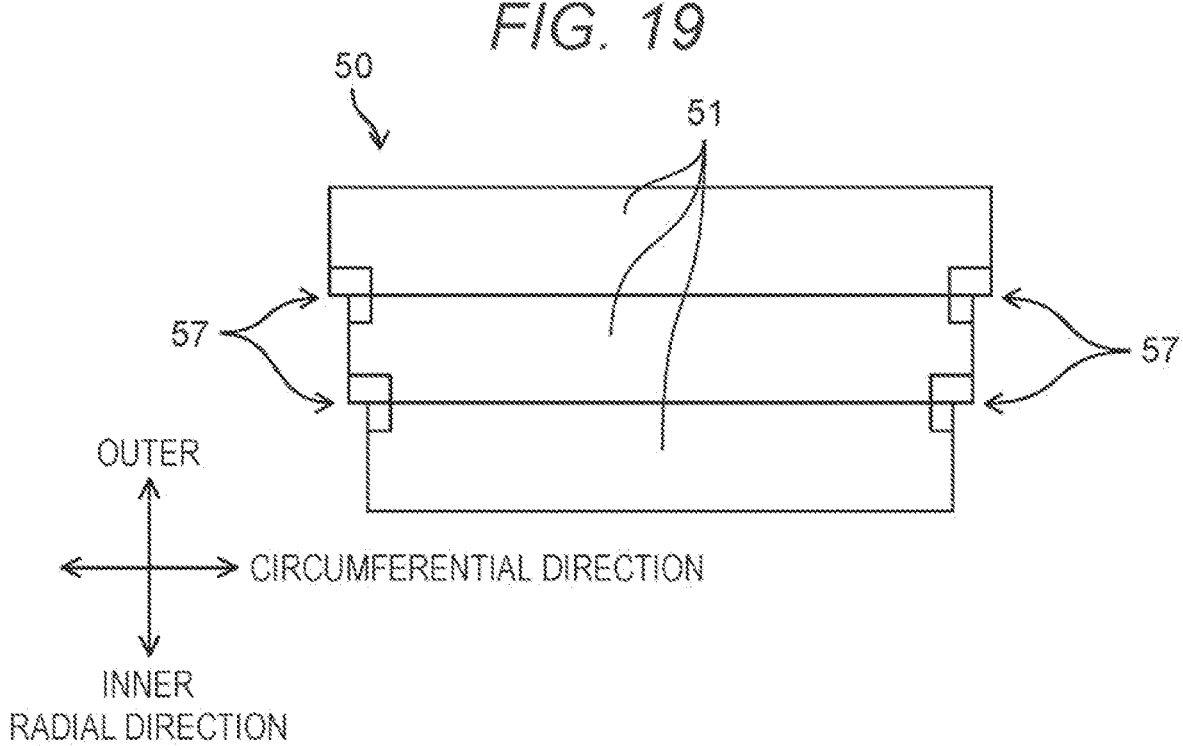
FIG. 19 is a side view of another strand-wound body according to the second exemplary embodiment.
Figure 20A:
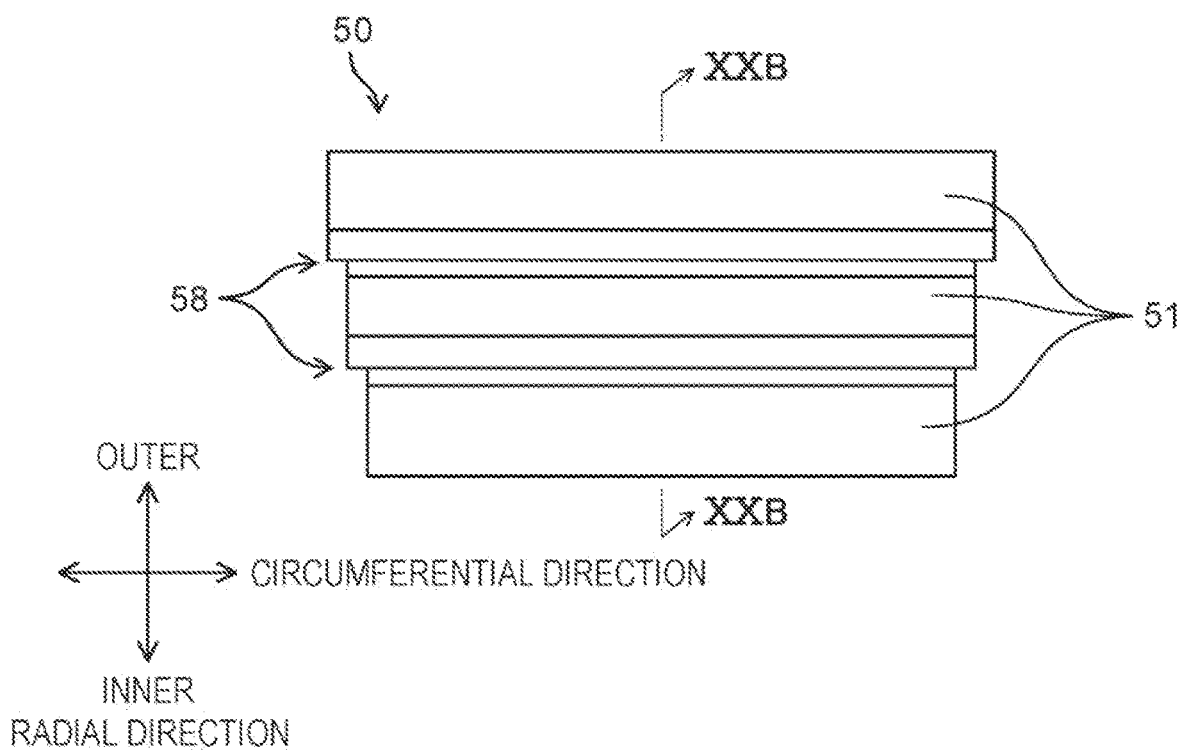
FIG. 20A is a side view of a still another strand-wound body according to the second exemplary embodiment.
Figure 20B:
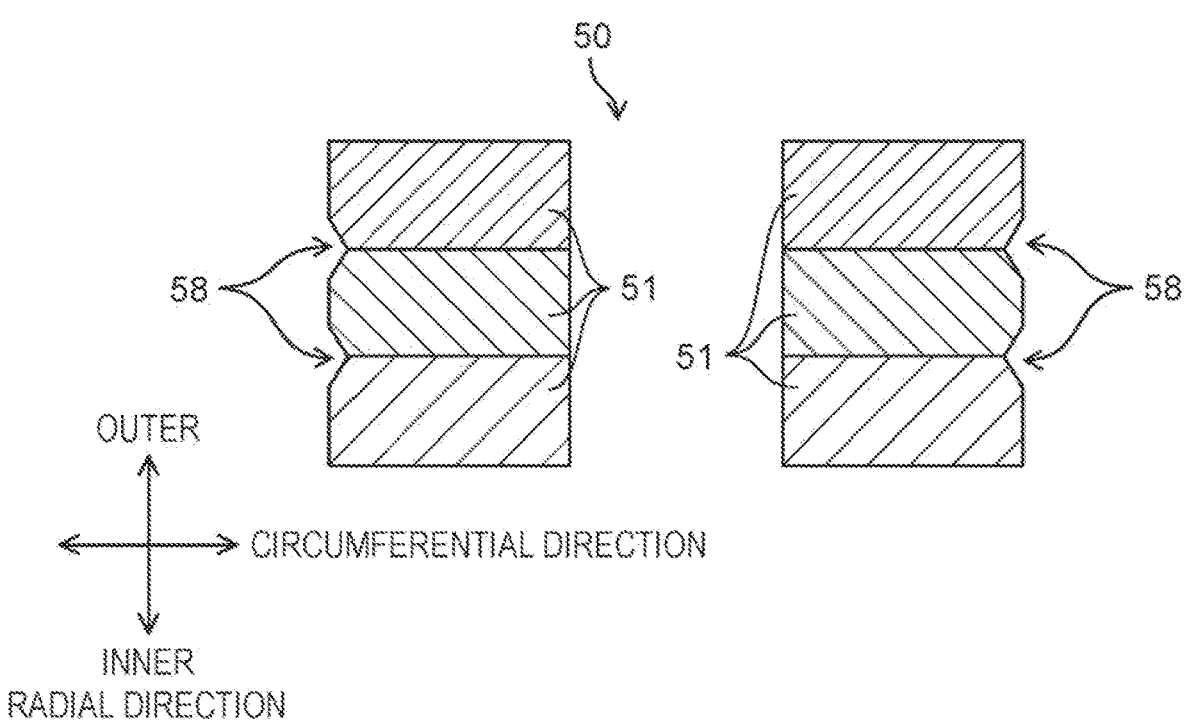
FIG. 20B is a cross-sectional view taken along line XXB-XXB in FIG. 20A.

FIG. 17 is a side view of strand-wound body 50 according to a second exemplary embodiment. FIG. 18 is a partial cross-sectional view of coil 40 according to the second exemplary embodiment. FIG. 19 is a side view of another strand-wound body 50 according to the second exemplary embodiment. FIG. 20A is a side view of still another strand-wound body 50 according to the second exemplary embodiment. FIG. 20B is a cross-sectional view taken along line XXB-XXB in FIG. 20A.

As illustrated in FIG. 17, strand-wound body 50 described in the present exemplary embodiment has a configuration different from the configuration illustrated in the first exemplary embodiment in that, at each of four corners of an outer peripheral surface of each of two mutually adjacent turns, there is provided recess 56 recessed from an outer peripheral surface toward an inner peripheral surface of strand-wound body 50. Each of recesses 56 is formed by linearly cutting out one of four corners of the outer peripheral surface. As a result, recesses 56 have a substantially triangular plane at corner parts of strand-wound body 50. In other words, recesses 56 each have a shape obtained by substantially cutting out a triangular pyramid from one of the corner parts of strand-wound body 50.

By configuring strand-wound body 50 as described above, it is easy to provide insulating resin 60 between mutually adjacent turns in the insulator coating step illustrated in FIG. 5. A further description will be given below.

As described above, in the insulator coating step, as illustrated in FIGS. 6A and 6B, slide cores 410 come in contact with strand-wound body 50 to fix position of strand-wound body 50. At this time, tips of slide cores 410 are brought into contact with recesses 56 provided at the four corners of the outer peripheral surface of each of the two mutually adjacent turns. In the following description, slide cores 410 may be referred to as pressing portions 410.

When pressing portions 410 are pressed toward the inner peripheral surface of strand-wound body 50 in this state, a predetermined interval is provided between the two adjacent turns as illustrated in FIG. 18. Subsequently, molten resin is injected, and the temperature is then lowered, thereby insulating resin 60 is formed between the two adjacent turns.

The present exemplary embodiment provides effects similar to those provided by the configuration illustrated in the first exemplary embodiment. Specifically, the coil of the present disclosure can greatly reduce manufacturing cost of coil 40, particularly, cost for forming the insulating film on the surface of strand-wound body 50. In addition, the surface of strand-wound body 50 can be reliably covered with insulating resin 60. As a result, insulation failure of coil 40 can be reliably reduced. Therefore, the reliability of stator 100 and hence the reliability of motor 1000 can be improved.

Since the tips of pressing portions 410 are in contact with recesses 56 while the insulator coating step is being performed, insulating resin 60 is not formed on outer peripheral edges, of the two adjacent turns, including the surface of recesses 56. However, since the two adjacent turns are separated from each other, occurrence of insulation failure of coil 40 is prevented or reduced.

In addition, pressing portions 410 are in contact with recesses 56 to widen a gap between two adjacent turns. Therefore, because the thickness of insulating resin 60 provided between the two turns is equal to or less than a width of recesses 56 along the radial direction, which is the stacking direction of the turns, it is easy to control the thickness of insulating resin 60.

The shape of the recesses 56 is not particularly limited to the example illustrated in FIG. 17. For example, as illustrated in FIG. 19, there may be provided recesses 57 each having a quadrangular shape in side view at one of four corners of the outer peripheral surfaces of two mutually adjacent turns.

Further, as illustrated in FIGS. 20A and 20B, in two mutually adjacent turns, sides facing each other on the outer peripheral surfaces of side portions 51, that is, the upper side of one side portion 51 and the lower side of the other side portion 51 may each have a shape chamfered from one end to the other end of corresponding side portion 51. In other words, there may be provided chamfered portion 58 that is formed in the upper side of one side portion 51 and the lower side of the other side portion 51 from one end to the other end of corresponding side portion 51.

This configuration enables insulating resin 60 to enter more easily between two adjacent turns, and the surface of strand-wound body 50 can be reliably covered with insulating resin 60. As a result, insulation failure of coil 40 can be reliably reduced. Therefore, the reliability of stator 100 and hence the reliability of motor 1000 can be improved.

Depending on a size or shape of the tip of pressing portion 410, one of the sides facing each other on the outer peripheral surfaces of side portions 51, in other words, the upper side of one side portion 51 or the lower side of the other side portion 51 may have a shape chamfered from one end to the other end of corresponding side portion 51.

In the example illustrated in FIG. 20B, the sides facing each other on the outer peripheral surfaces of side portions 51 are linearly chamfered, but the present invention is not particularly limited thereto, and for example, may have a round chamfered shape.

As described above, the following configuration may be employed in the coil according to the present exemplary embodiment. The i-th turn has a quadrangular ring shape having four side portions 51. In the i-th turn, each of four side portions 51 has a surface covered with insulating resin 60, at least four corners of an outer peripheral surface of each of two turns mutually adjacent in a stacking direction of the strand are each provided with recess 56 that is recessed from an outer peripheral surface toward an inner peripheral surface of strand-wound body 50, and the insulating resin provided between the two turns has a thickness less than or equal to a width of recesses 56 along the stacking direction.

The following configuration may be employed. The i-th turn, where i is an integer and $1 \leq i \leq n$, has a quadrangular ring shape having four side portions. In the i-th turn, each of four side portions 51 has a surface covered with insulating resin 60. In two turns mutually adjacent in a stacking direction of the strand, at least one of an upper side and a lower side of the outer peripheral surface of one side portion 51 has a shape of being chamfered from a first end to a second end of the one side portion 51.

Other Exemplary Embodiments

A new exemplary embodiment can be configured by appropriately combining the components disclosed in the first and second exemplary embodiments and the modifications. For example, recesses 56 described in the third modification may be formed in strand-wound body 50 described in the first exemplary embodiment or the first or second modification.

The coil according to the present disclosure can reduce manufacturing cost of the insulating film and is therefore useful as a low-cost molded coil.

The invention claimed is:

1. A coil comprising:
   a strand-wound body including stacked n turns of a wound strand that is made of a conductor having a quadrangular cross-section, where n is a natural number; and
   an insulating resin covering a surface of the strand-wound body, wherein:
   a surface of an i-th turn, of the strand-wound body having a ring shape, is covered with the insulating resin, where i is an integer and $1 \leq i \leq n$,
   the insulating resin is formed continuously and integrally in a first turn to an n-th turn of the strand-wound body,
   in at least a j-th turn of the strand-wound body, where j is an integer and $2 \leq j \leq n-1$, there are provided one or a plurality of first grooves that extend from an outer peripheral surface to an inner peripheral surface of the strand-wound body, and
   the one or the plurality of first grooves are filled with the insulating resin.

2. The coil according to claim 1, wherein:
   the i-th turn has a quadrangular ring shape having four side portions,
   in the i-th turn, each of the four side portions has a surface covered with the insulating resin, and
   the one or the plurality of first grooves are provided in each of the four side portions included in the at least the j-th turn.

3. The coil according to claim 1, wherein each of the one or the plurality of first grooves has a tapered shape at least one of whose width and depth changes from the outer peripheral surface to the inner peripheral surface of the strand-wound body.

4. A coil comprising:
   a strand-wound body including stacked n turns of a wound strand that is made of a conductor having a quadrangular cross-section, where n is a natural number; and
   an insulating resin covering a surface of the strand-wound body, wherein:
   in the j-th turn conductor of the strand-wound body, where j is an integer and $2 \leq j \leq n-1$, there are provided a plurality of second grooves on at least one of surfaces of the j-th turn conductor and a surface of the conductor facing to the j-th turn conductor, each of the plurality of second grooves has both ends provided on one of an outer peripheral surface of at least the j-th turn conductor and a surface of a conductor facing to the j-th turn, and the plurality of second grooves are filled with the insulating resin.

5. The coil according to claim 4, wherein:

the i-th turn has a quadrangular ring shape having four side portions, in the i-th turn, each of the four side portions has a surface covered with the insulating resin, and one or a plurality of first grooves are provided in each side portion of one pair or two pairs of mutually opposing side portions of the four side portions included in the at least the j-th turn, the one or the plurality of first grooves extending from a first end to a second end of the each side portion.

6. The coil according to claim 5, wherein each of the one or the plurality of first grooves has a tapered shape at least one of whose width and depth changes from the first end to the second end of one of the side portions.

7. The coil according to claim 1, wherein at least one of the outer peripheral surfaces and the inner peripheral surface of the strand-wound body is further provided with a third groove extending along a stacking direction of the strand, and the third groove is connected to one end of the one or the plurality of first grooves.

8. The coil according to claim 1, wherein the i-th turn has a quadrangular ring shape having four side portions, in the i-th turn, each of the four side portions has a surface covered with the insulating resin, at least four corners of an outer peripheral surface of each of two turns mutually adjacent in a stacking direction of the strand are each provided with a recess that is recessed from an outer peripheral surface toward an inner peripheral surface of the strand-wound body, and the insulating resin provided between the two turns has a thickness less than or equal to a width of the recesses along the stacking direction.

9. The coil according to claim 1, wherein the i-th turn, where i is an integer and $1 \leq i \leq n$, has a quadrangular ring shape having four side portions, in the i-th turn, each of the four side portions has a surface covered with the insulating resin, and in two turns mutually adjacent in a stacking direction of the strand, at least one of an upper side and a lower side of the outer peripheral surface of the side portion has a shape of being chamfered from a first end to a second end of the side portion.

10. A stator comprising:

a stator core having a tooth portion; and the coil according to claim 1, wherein;

the insulating resin is formed to continuously cover at least an outer peripheral surface and an inner peripheral surface of the strand-wound body and both end surfaces of the strand-wound body in a stacking direction of the strand, and an insulating member is provided between mutually adjacent turns.

11. A stator comprising:

a stator core having a tooth portion; and the coil according to claim 1, wherein the insulating resin is formed to continuously cover an outer peripheral surface and an inner peripheral surface of the strand-wound body and both end surfaces of the strand-wound body in a stacking direction of the strand.

12. The stator according to claim 10, wherein the insulating member provided between mutually adjacent turns includes a member different from the insulating resin.

13. The stator according to claim 12, wherein the insulating member is insulating paper.

14. The stator according to claim 12, wherein a plurality of the insulating members are provided between mutually adjacent turns with an interval between each other.

15. The stator according to claim 10, wherein the coil is adhered to the tooth portion while the insulating resin provided on the inner peripheral surface of the coil is in contact with a surface of the tooth portion.

16. The stator according to claim 15, wherein the insulating resin provided on the inner peripheral surface of the coil is thicker than the insulating resin provided on the outer peripheral surface of the coil or than the insulating resin provided on either one of both end surfaces of the coil in the stacking direction of the strand.

17. A motor comprising at least:

a rotor including an output shaft at an axial center; and the stator according to claim 10, the stator being provided coaxially with the rotor and at a predetermined interval from the rotor.

* * * * *